US008605206B2

(12) United States Patent
Hayakawa et al.

(10) Patent No.: US 8,605,206 B2
(45) Date of Patent: Dec. 10, 2013

(54) CONTROL APPARATUS, CONTROL METHOD, IMAGING APPARATUS, PROGRAM AND IMAGING SYSTEM

(75) Inventors: Hideki Hayakawa, Tokyo (JP); Keiichi Kuroda, Tokyo (JP); Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 13/383,589

(22) PCT Filed: Jul. 21, 2010

(86) PCT No.: PCT/JP2010/062210
§ 371 (c)(1),
(2), (4) Date: Jan. 12, 2012

(87) PCT Pub. No.: WO2011/013545
PCT Pub. Date: Feb. 3, 2011

(65) Prior Publication Data
US 2012/0113277 A1 May 10, 2012

(30) Foreign Application Priority Data
Jul. 28, 2009 (JP) ................................. 2009-175042

(51) Int. Cl.
*H04N 5/222* (2006.01)
(52) U.S. Cl.
USPC ........................ 348/373; 348/207.1; 348/211.9
(58) Field of Classification Search
None
See application file for complete search history.

(56) References Cited

U.S. PATENT DOCUMENTS 5,281,988 A * 1/1994 Martin ............................ 396/59
6,357,936 B1 * 3/2002 Elberbaum ..................... 396/427
(Continued)

FOREIGN PATENT DOCUMENTS

| JP | 2002 218284 | 8/2002 |
| JP | 2002 295789 | 10/2002 |

(Continued)

OTHER PUBLICATIONS

U.S. Appl. No. 13/386,933, filed Jan. 25, 2012, Kuroda.

(Continued)

*Primary Examiner* — James Hannett
*Assistant Examiner* — Wesley J Chiu
(74) *Attorney, Agent, or Firm* — Oblon, Spivak, McClelland, Maier & Neustadt, L.L.P.

(57) ABSTRACT

The present invention relates to a control apparatus, a control method, an imaging apparatus, a program, and an imaging system able to prevent cable wrapping, etc. which has a risk of occurring when rotating an imaging apparatus while a cable is connected in an imaging system which conducts automatic imaging operations by automatic composing and which is provided with an imaging apparatus and a motorized platform apparatus that rotatably drives the imaging apparatus, for example.

It is determined whether or not a cable is connected to a cable port, and on the basis of the determination results, it is controlled such that the rotational angle range for a rotational driving unit is restricted. Thus, the above problem can be solved.

10 Claims, 17 Drawing Sheets

(56) References Cited

U.S. PATENT DOCUMENTS

| | | | |
|---|---|---|---|
| 6,587,750 B2* | 7/2003 | Gerbi et al. | 700/245 |
| 6,628,338 B1* | 9/2003 | Elberbaum et al. | 348/373 |
| 7,133,280 B2* | 11/2006 | Love | 361/679.07 |
| 7,596,832 B2* | 10/2009 | Hsieh et al. | 16/342 |
| 7,736,071 B2* | 6/2010 | Wahl et al. | 396/419 |
| 2008/0260369 A1* | 10/2008 | Ibaraki | 396/55 |
| 2009/0073388 A1* | 3/2009 | Dumm | 352/243 |
| 2009/0103778 A1* | 4/2009 | Yoshizumi et al. | 382/103 |
| 2010/0128122 A1* | 5/2010 | Wright et al. | 348/143 |
| 2010/0157075 A1* | 6/2010 | Yoshizumi | 348/211.9 |

FOREIGN PATENT DOCUMENTS

| | | |
|---|---|---|
| JP | 2004 236463 | 8/2004 |
| JP | 2007 288894 | 11/2007 |
| JP | 2009 100300 | 5/2009 |

OTHER PUBLICATIONS

U.S. Appl. No. 13/383,450, filed Jan. 11, 2012, Yoshizumi.

U.S. Appl. No. 13/384,898, filed Jan. 19, 2012, Yoshizumi.

U.S. Appl. No. 13/384,686, filed Jan. 18, 2012, Yoshizumi.

* cited by examiner

DURING AUTOMATIC
IMAGING OPERATIONS

CONTROL APPARATUS, CONTROL METHOD, IMAGING APPARATUS, PROGRAM AND IMAGING SYSTEM

TECHNICAL FIELD

The present invention relates to a control apparatus provided with a driving controller that controls a driving unit which varies the rotational angle of a movable unit with respect to a stationary unit, on the basis of a rotational angle range setting, and to a control method therefor.

Also, the present invention relates to an imaging apparatus provided with an imaging unit that conducts imaging, a cable port which removably connects a cable and which is formed at a position that rotates as rotation operations are conducted by a driving unit which varies the rotational angle of the imaging unit with respect to a stationary unit, and a driving controller that controls the driving unit on the basis of a rotational angle range setting. Also, the present invention relates to a program causing processing to be executed by the imaging apparatus.

Furthermore, the present invention relates to an imaging system provided with an imaging apparatus, and a platform apparatus which removably holds the imaging apparatus and which is provided with a driving controller that controls a driving unit which varies the rotational angle of the imaging apparatus with respect to a stationary unit, on the basis of a rotational angle range setting.

BACKGROUND ART

PTL 1 discloses technology wherein automatic composing and automatic recording of an imaged image obtained by such composing is conducted by an imaging system provided with a digital still camera and a motorized platform that varies the pan/tilt orientation of the digital still camera.

With the technology described in PTL 1, face detection technology, for example, is used to search for a human subject. Specifically, a subject (a human face) appearing inside the frame is while rotating the digital still camera in the pan direction with the platform.

Then, in the case where a subject is detected inside the frame as a result of such a subject search, rotation in the pan direction is stopped, and a determination regarding composition regarded as optimal (optimal composition determination) is made according to the detected state of a subject inside the frame at that time (e.g., the number, position, size, etc. of the subject). In other words, respective pan/tilt/zoom angles regarded as optimal are computed.

Furthermore, in response to respective pan/tilt/zoom angles regarded as optimal being computed by the optimal composition determination in this way, these angles are taken to be target angles with which to respectively adjust the pan/tilt/zoom angles (composing).

After completion of such composing, automatic recording by the imaged image is conducted.

According to automatic imaging operations conducted by automatic composing as above (automatic recording of an imaged image), it is possible to automatically record an imaged image with a composition regarded as optimal, without requiring any shooting operations by a user.

CITATION LIST

Patent Literature

PTL 1: Japanese Unexamined Patent Application Publication No. 2009-100300

SUMMARY OF INVENTION

Technical Problem

Herein, in an imaging system that executes automatic imaging operations like the above, it is possible to configure the platform to acquire its own operating power from a commercial AC power source, and also to configure the platform to function as a cradle (dock) for charging a digital still camera. Furthermore, it can be configured such that a playback image from a digital still camera 1 is externally output via the platform.

Given these exemplary circumstances, it is conceivable that the platform may be configured such that required cables such as a power cable and a video cable are connectable thereto.

However, with the imaging system described above, a subject search is configured to search for a subject to be shot by panning a digital still camera.

In PTL 1, it is configured such that the main unit of the platform itself is rotatably driven when driving such panning. For this reason, when the imaging system is used in a state where cables are connected to the platform as above, there is a risk of a situation where the cables wrap around the platform as panning is driven in accordance with the above subject search, etc. In some cases, the platform may rise up due to the stress of the cables and fall over. In any case, intended imaging operations cannot be performed and imaging operation itself is impeded.

Herein, if attempting to prevent the occurrence of cable wrapping, etc. as panning is driven as above, it is conceivable to form cable ports on a part of the platform that is not rotatably driven. In other words, panning an attached digital still camera requires a platform to be configured with a separate pedestal part having a ground contact area (the stationary part), and a movable part which rotates itself in order to impart rotational driving force in the pan direction to the digital still camera. If cable wrapping is to be prevented, it is conceivable to form cable ports on the pedestal that acts as the above stationary part.

However, in the case where cable ports are provided on a pedestal that acts as a stationary part in this way, it becomes extremely difficult to lay out wiring between these cable ports and the platform—digital still camera port. In practice, attempting to make such wiring between the cable ports and the platform—digital still camera port compatible with rotation imposes large increases in cost, etc., which produces great difficulties for the realization of such wiring. In other words, it can hardly be called a realistic configuration.

The present invention presupposes the more realistic case wherein cable ports are formed on the above movable part, and an object thereof is to attempt to solve problems related to the above-discussed cable wrapping, etc. which become problematic in that case.

Solution to Problem

In order to solve the above problem, in the present invention, an imaging unit driving apparatus is configured as follows.

Namely, a rotational driving unit is provided which varies the rotational angle of an imaging unit that conducts imaging.

Also, a cable port is provided which removably connects a cable and which is formed at a position that rotates as rotation operations are conducted by the rotational driving unit.

Also, a controller is provided which determines whether or not the cable is connected to the cable port, and on the basis of the determination results, controls the rotational angle range for the rotational driving unit.

According to the present invention, the rotational angle range for the rotational driving unit can be controlled to accommodate the case where cables are connected to cable ports.

Advantageous Effects of Invention

According to the present invention, in an apparatus provided with a rotational driving unit that varies the rotational angle of an imaging unit and cable ports formed at a position that rotates as rotation operations are conducted by the rotational driving unit, it can be configured such that the rotational angle range for the rotational driving unit is restricted to accommodate the case where cables are connected to the cable ports. In so doing, a situation where the cable connected to the cable port wraps around the apparatus can be effectively prevented from occurring in the case where rotational driving is conducted as part of a subject search, for example. Also, a situation where the apparatus itself rises up and falls over due to the stress of the cable can be effectively prevented from occurring.

DESCRIPTION OF EMBODIMENTS

Hereinafter, embodiments for carrying out the invention in this application (hereinafter called embodiments) will be described in the following order.
<1. Configuration of imaging system>
 [1-1. Overall system configuration]
 [1-2. Digital still camera]
 [1-3. Platform]
 [1-4. Automatic imaging operations conducted by automatic composing]
 [1-5. Setting a rotational angle]
<2. Rotational angle restriction technique according to embodiment>
 [2-1. Specific examples of operation]
 [2-2. Processing sequences]
<3. Modifications>

Herein, in the following description, the terms "frame", "angle of view", "imaging field", "imaging field selection angle", and "composition" will be used. Definitions of the respective terms are as follows.

The "frame" refers to the areal range equivalent to one screen as seen when an image, etc. is inlaid therein. Typically, a frame has a rectangular frame shape that is long vertically or horizontally.

The "angle of view" is also called the zoom angle, etc., and is an angular expression of the range contained in a frame as determined by the position of the zoom lens in the imaging optics. Strictly speaking, the angle of view is also determined by the focal length of the imaging optics and the size of the image surface (the image sensor or film), but herein the image surface size is fixed, and the factors that vary according to the focal length are called the angle of view. Hereinafter, values for the angle of view may be expressed in terms of focal length (the 35 mm equivalent, for example) in some cases.

The "imaging field" expresses the field of view for the imaging optics, and is equivalent to the range captured by the frame.

The "imaging field selection angle" is an angular expression of the factors determining which part of the scene surrounding the imaging apparatus is captured. Herein, the imaging field selection angle is determined by the frame, as well as by the oscillation angle in the pan (horizontal) direction and the oscillation angle in the tilt (vertical) direction (angle of elevation, angle of depression).

"Composition", also called framing, is determined by the imaging field selection angle setting, or in other words, in this case the composition is determined by the pan/tilt angles and the angle of view (zoom).

Herein, in the present embodiment, a case will be given by way of example wherein an imaging unit driving apparatus and an imaging apparatus of the present invention are configured as an imaging system consisting of a digital still camera and a platform that removably holds the digital still camera.

<1. Configuration of Imaging System>

1-1. Overall System Configuration

An imaging system of the embodiment consists of a digital still camera 1, and a platform 10 to which the digital still camera 1 is removably attached.

Figure 1:
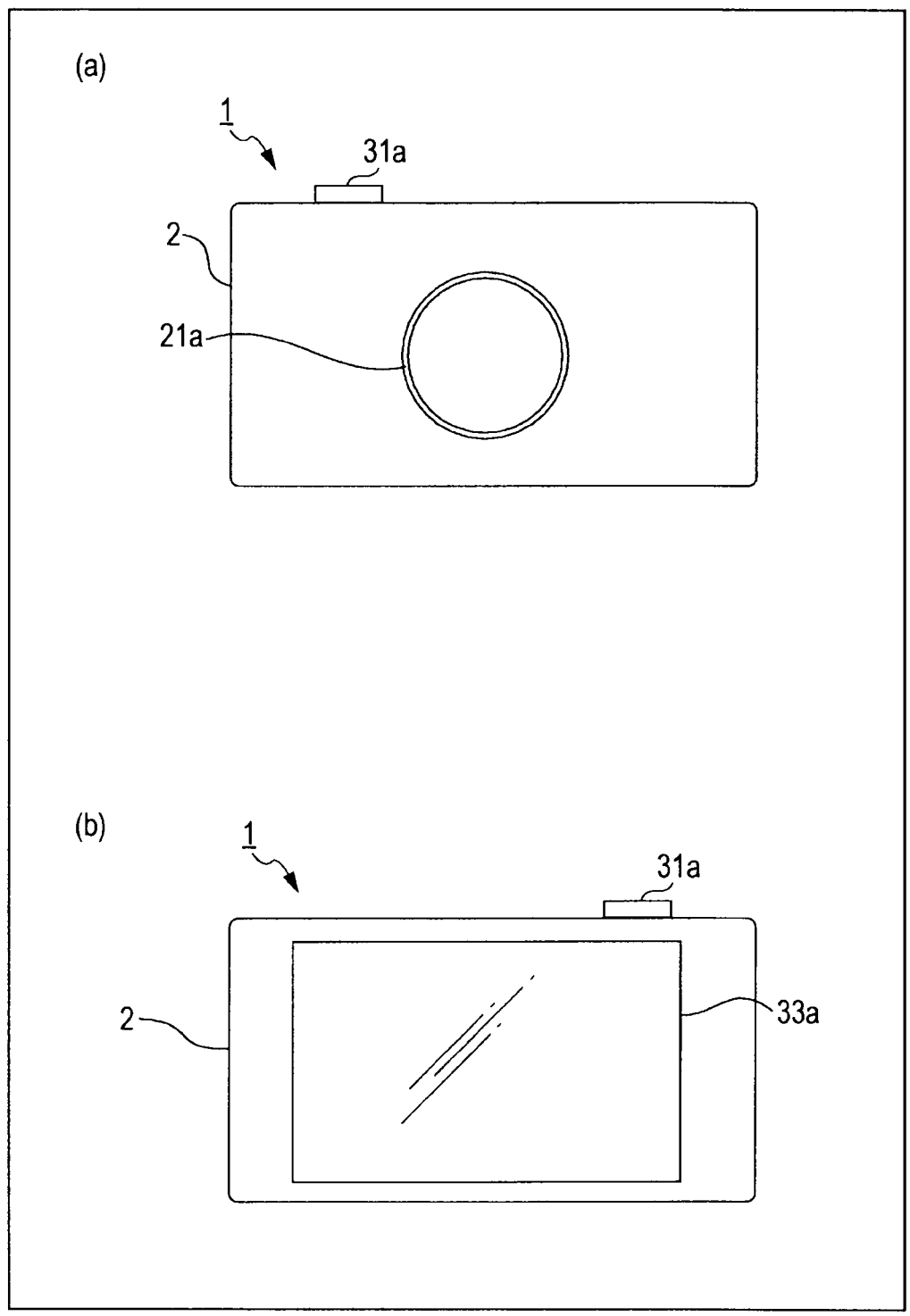
FIG. 1 is a diagram simply illustrating front view and a rear view of the exterior of a digital still camera, being a component of an imaging apparatus (imaging unit driving apparatus, imaging system) according to an embodiment.

First, an exemplary exterior of the digital still camera 1 is illustrated in FIG. 1. In FIG. 1, (a) and (b) are a front view and a rear view of the digital still camera 1, respectively.

First, as illustrated in (a) of FIG. 1, the digital still camera 1 illustrated in this drawing is provided with a lens unit 21a on the front side of a main unit 2. The lens unit 21a is a member expressed outward from the main unit 2 as optics for imaging.

Also, a release button 31a is provided on the top of the main unit 2. In an imaging mode, an image that has been imaged by the lens unit 21a (an imaged image) is generated as an image signal. Then, when the release button 31a is operated in this imaging mode, the imaged image at that timing is recorded to a recording medium as image data for a still image. In other words, photography is conducted.

Also, as illustrated in (b) of FIG. 1, the digital still camera 1 has a display screen unit 33a on its rear side.

During an imaging mode, the image being imaged by the lens unit 21a at that time, referred to as a through-the-lens image, etc., is displayed on the display screen unit 33a. Also, during a playback mode, image data recorded to a recorded medium is played back and displayed. Furthermore, operable images are displayed as a GUI (Graphical User Interface) in response to a user operating the digital still camera 1.

Herein, the digital still camera 1 of the present embodiment is taken to have a touch panel built in with the display screen unit 33a. Thus, a user is able to perform appropriate operations by placing his or her finger on the display screen unit 33a.

Figure 2:
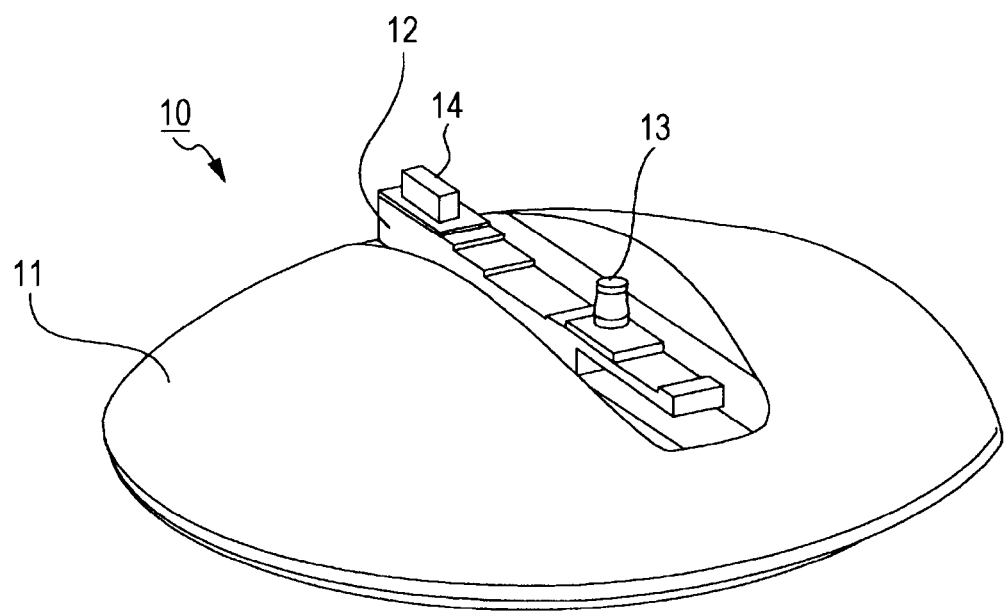
FIG. 2 is a perspective view illustrating an exemplary exterior of a platform, being a component of an imaging apparatus (imaging unit driving apparatus, imaging system) according to an embodiment.
Figure 3:
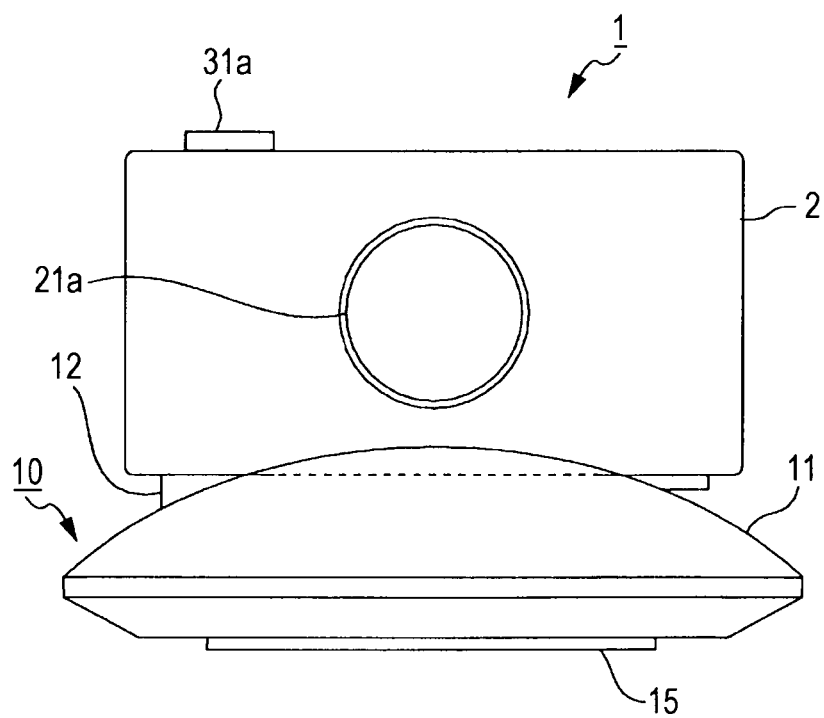
FIG. 3 is a front view illustrating an exemplary formation of an imaging apparatus (imaging unit driving apparatus, imaging system) according to an embodiment in which a digital still camera is attached to a platform.
Figure 4:
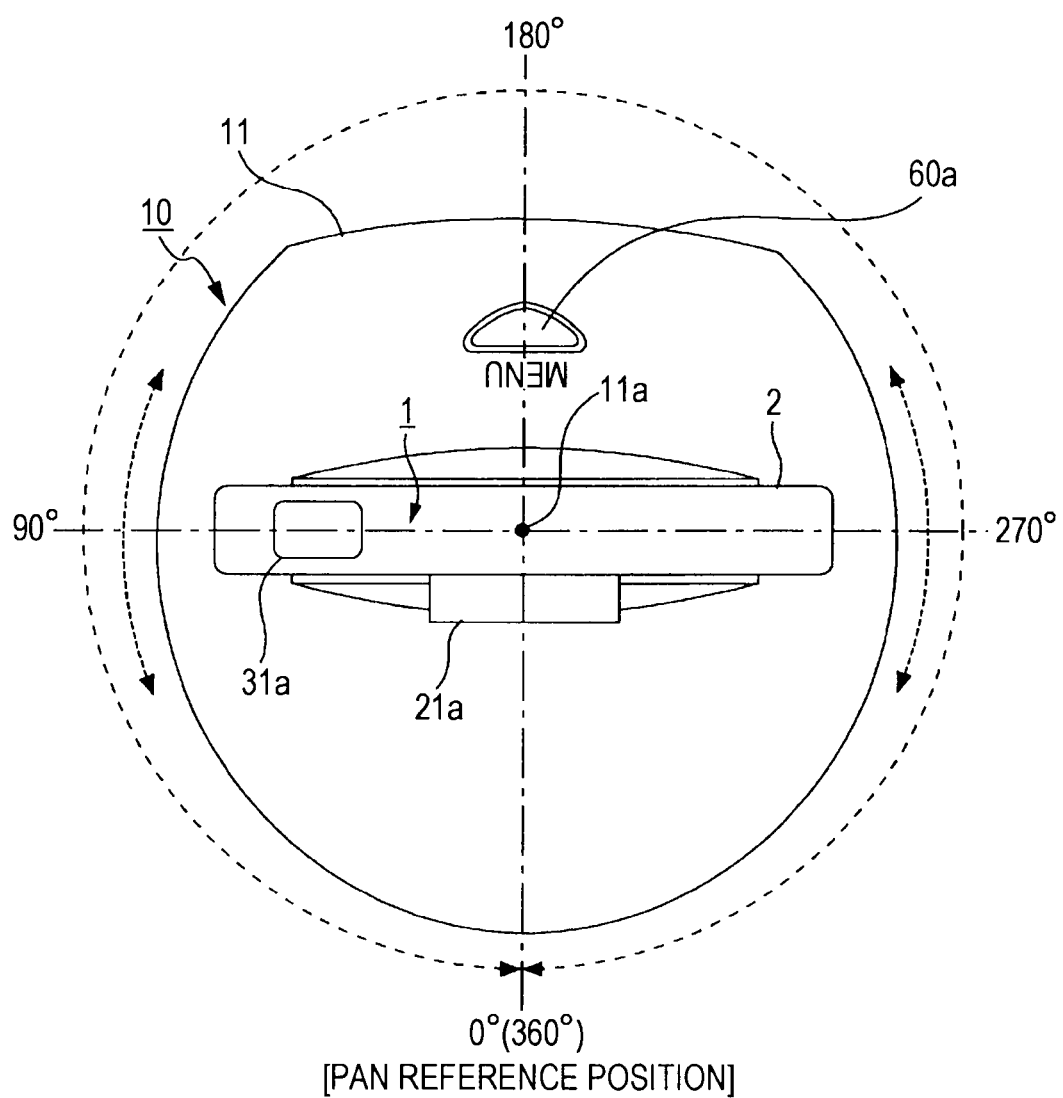
FIG. 4 is a plan view illustrating an exemplary formation of an imaging apparatus (imaging unit driving apparatus, imaging system) according to an embodiment in which a digital still camera is attached to a platform, together with an exemplary state of motion in the pan direction.
Figure 5:
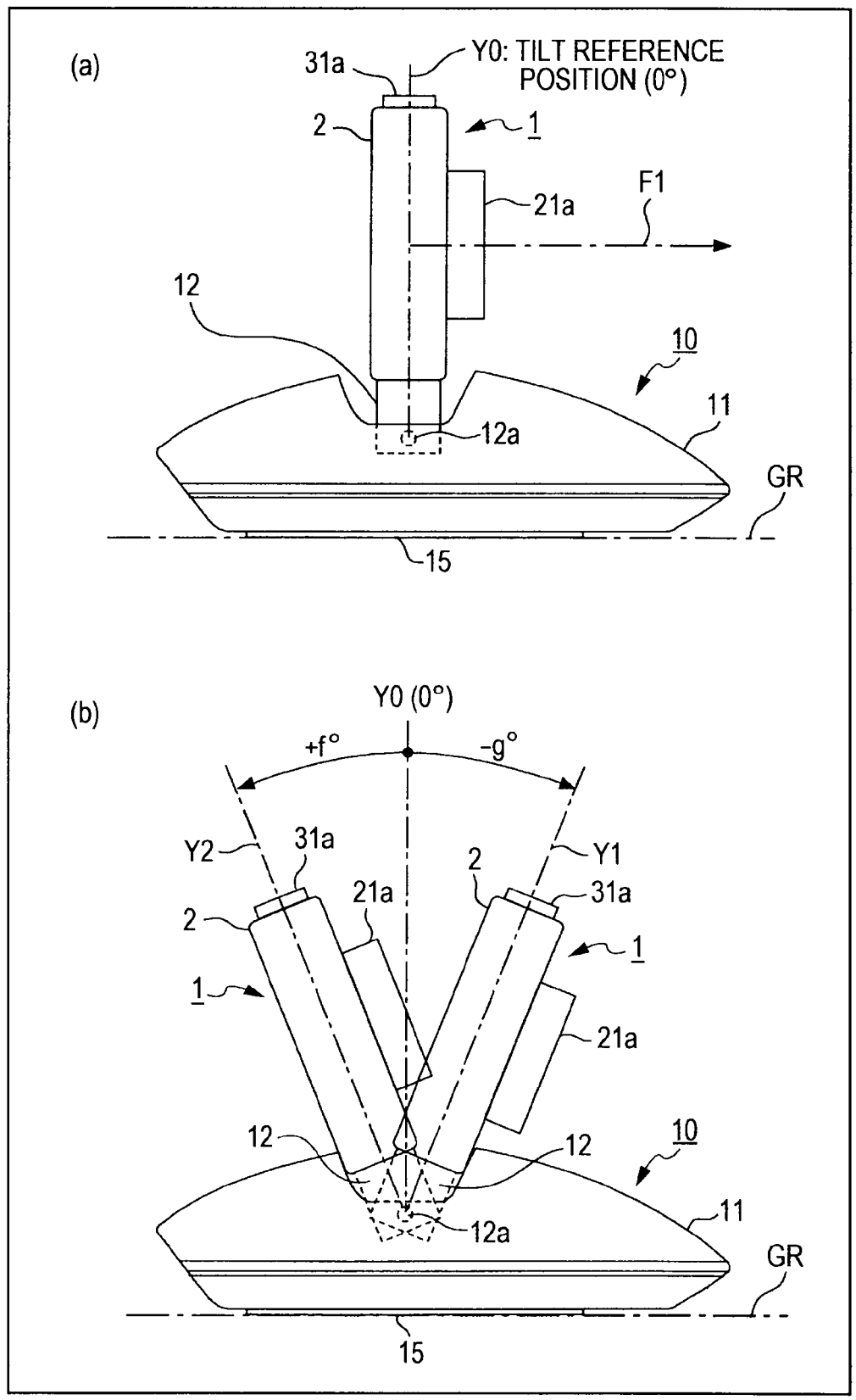
FIG. 5 is a lateral view illustrating an exemplary formation of an imaging apparatus (imaging unit driving apparatus, imaging system) according to an embodiment in which a digital still camera is attached to a platform, together with an exemplary state of motion in the tilt direction.

FIG. 2 is a perspective view illustrating an exterior of the platform 10. Also, FIGS. 3 to 5 illustrate a state where the digital still camera 1 is placed onto the platform 10 in a suitable state as an exterior of an automatic imaging system of the present embodiment. FIG. 3 is a front view, FIG. 4 is a plan view, and FIG. 5 is a lateral view (more particularly, the movable range of a tilt mechanism is illustrated with a lateral view in (b) of FIG. 5).

As illustrated in FIG. 2 and FIGS. 3, 4, and 5, the platform 10 has a structure which is largely a combination of a main unit 11 on top of a pedestal 15, and furthermore in which a camera seat 12 is attached to the main unit 11.

When attempting to attach the digital still camera 1 to the platform 10, the bottom of the digital still camera 1 is placed on the top side of the camera seat 12. As illustrated in FIG. 2, a projection 13 and a connector 14 are provided on the top part of the camera seat 12. Although omitted from illustration, a hole that engages with the projection 13 is formed on the bottom part of the main unit 2 of the digital still camera 1. In a state where the digital still camera 1 is correctly placed on the camera seat 12, the hole and the projection 13 are in an engaged state. It is configured such that, given this state, the digital still camera 1 will not become misaligned with or disengaged from the platform 10 under ordinary panning/tilting operations of the platform 10.

Also, in the digital still camera 1, a connector is also provided at a given position on its bottom part. As above, in a state where the digital still camera 1 is correctly attached to the camera seat 12, the connector on the digital still camera 1 and the connector 14 on the platform 10 are connected and in a state that at least enables bidirectional communication.

Furthermore, in practice the connector 14 and the projection 13, for example, may be configured such that their positions on the camera seat 12 are modifiable (movable) within a given range. Moreover, it is configured such that, by additionally using an adapter, etc. matching the shape of the bottom part of the digital still camera 1, for example, different models of digital still cameras can be attached to the camera seat 12 in a communicable state with the platform 10.

Next, basic motion of the digital still camera 1 in the pan/tilt directions by the platform 10 will be described.

First, basic motion in the pan direction is as follows.

In a state where, for example, the platform 10 is placed on a table or on the floor, etc., the bottom of the pedestal 15 contacts the ground. In this state, the main unit 11 is able to rotate in the clockwise and counter-clockwise directions about a rotational axis 11a, as illustrated in FIG. 4. In other words, it is thus possible to vary the imaging field selection angle in the horizontal direction (left/right direction) of the digital still camera 1 attached to the platform 10 (i.e., panning).

Furthermore, the pan mechanism of the platform 10 in this case has a structure whereby unlimited rotation of 360° or more can be freely conducted in both the clockwise and counter-clockwise directions.

Also, a reference position in the pan direction is determined for the pan mechanism of the platform 10.

Herein, as illustrated in FIG. 4, the pan reference position is taken to be 0° (360°). Moreover, the rotated position of the main unit 11 along the pan direction, or in other words the pan position (pan angle) is taken to be expressed by 0° to 360°.

Also, basic motion of the platform 10 in the tilt direction is as follows.

As illustrated by (a) and (b) in FIG. 5, motion in the tilt direction is obtained by the camera seat 12 tracing angles in both the elevation and depression directions about a rotational axis 12a.

Herein, (a) in FIG. 5 illustrates a state where the camera seat 12 is at a tilt reference position Y0 (0°). In this state, the imaging direction F1 which matches the imaging optical axis of (the optics of) the lens unit 21a is parallel to the ground plane GR where the pedestal 15 contacts the ground.

Moreover, as illustrated in (b) in FIG. 5, the camera seat 12 is first able to move in the elevation direction about the rotational axis 12a, in a range from the tilt reference position Y0 (0°) to a given maximum rotational angle +f°. Also, the camera seat 12 is able to move in the depression direction about the rotational axis 12a, in a range from the tilt reference position Y0 (0°) to a given maximum rotational angle −g°. In so doing, as a result of the camera seat 12 moving in a range from the maximum rotational angle +f° to the maximum rotational angle −g° with the tilt reference position Y0 (0°) as origin, it is possible to vary the imaging field selection angle in the tilt direction (up/down direction) of the digital still camera 1 attached to (the camera seat 12 of) the platform 10. In other words, tilting operation is obtained.

Figure 6:
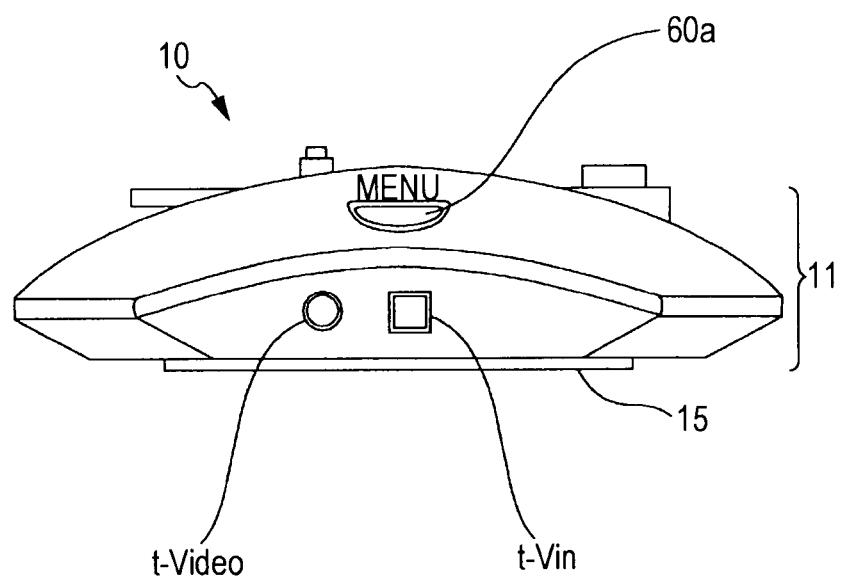
FIG. 6 is a rear view of a platform.

FIG. 6 illustrates a rear view of the platform 10.

As illustrated, in the platform 10, a power terminal unit t-Vin that removably connects a power cable and a video terminal unit t-Video that removably connects a video cable are formed on the back of the main unit 11.

Herein, in the case of this example, the platform 10 is configured to charge a digital still camera 1 attached to the camera seat 12 as discussed above by supplying power to the digital still camera 1 via the power terminal unit t-Vin. In other words, the platform 10 in this example is configured to also function as a cradle (dock) for charging the digital still camera 1.

Also, in the case of this example, the platform 10 is configured to externally output a video signal based on an imaged image, for example, via the video terminal unit t-Video in the case where such a video signal is transmitted from the digital still camera 1.

Also, as illustrated in FIG. 6 and in the previous FIG. 4, a menu button 60a is provided on the back of the main unit 11 of the platform 10, and will be discussed later.

[1-2. Digital Still Camera]

Figure 7:
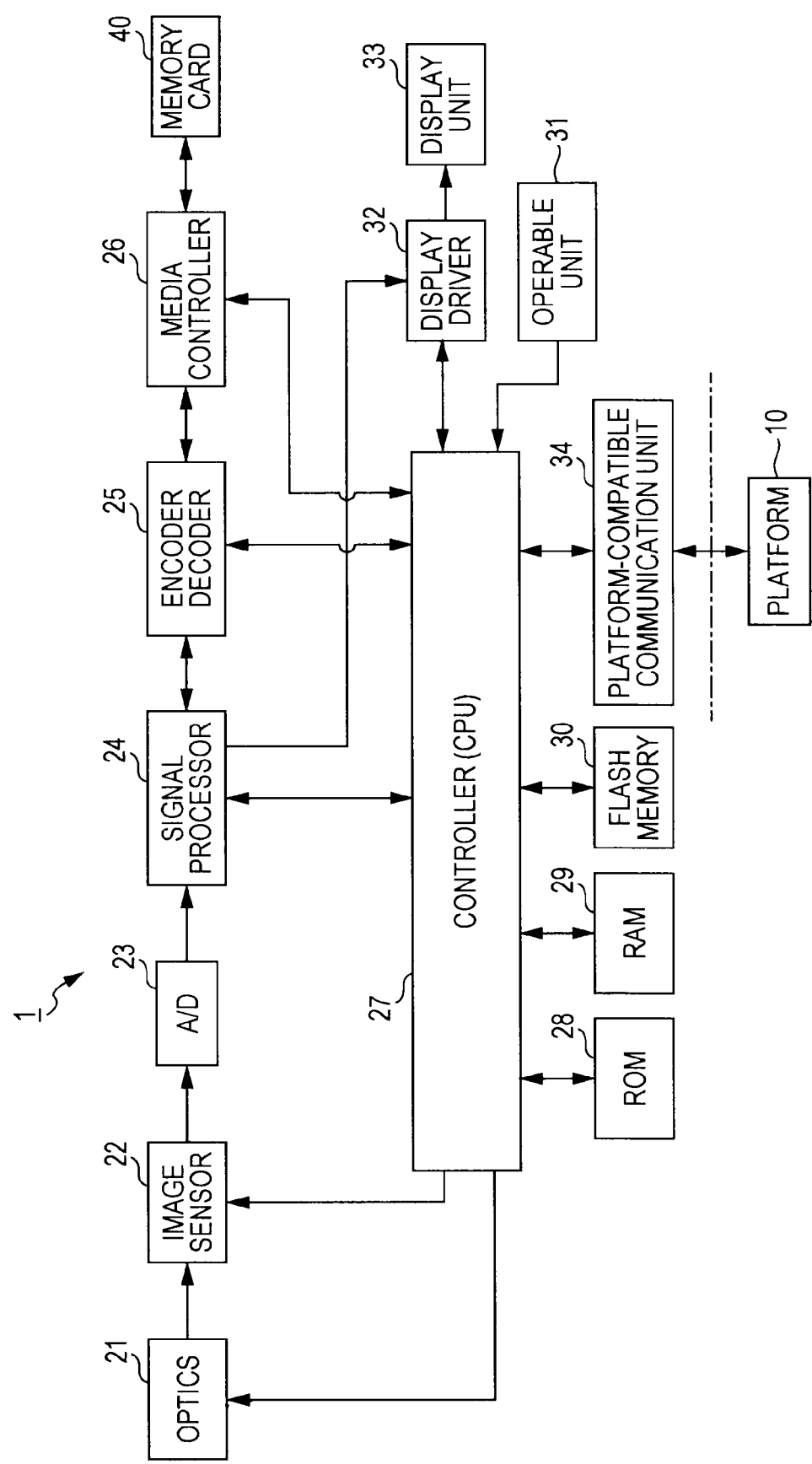
FIG. 7 is a block diagram illustrating an exemplary internal configuration of a digital still camera.

FIG. 7 is a block diagram illustrating an practical, exemplary internal configuration of a digital still camera 1.

In FIG. 7, first, the optics 21 consists of a group of a given number of lenses for imaging, including for example a zoom lens, focus lens, etc., and a diaphragm, etc. The optics 21 focus incident light onto the detecting surface of an image sensor 22 as imaging light.

Also provided in the optics 21 are driving mechanisms for driving the zoom lens, focus lens, diaphragm, etc. The operation of these driving mechanisms are controlled by what is called camera control, such as a zoom (angle of view) control, an automatic focal point adjustment control, an automatic exposure control, etc. taken to be executed by a controller 27, for example.

The image sensor 22 conducts what is called photoelectric conversion, which converts imaging light obtained by the optics 21 into an electrical signal. In order to do so, the image sensor 22 detects imaging light from the optics 21 on the detecting surfaces of photoelectric conversion elements, and successively outputs, according to given timings, the signal charge that accumulates according to the strength of the detected light. In so doing, an electrical signal corresponding to the imaging light (an imaging signal) is output.

Herein, the photoelectric conversion element (imaging element) implemented as the image sensor 22 is not particularly limited, but in current practice a CMOS (Complementary Metal-Oxide-Semiconductor) sensor, CCD (Charge-Coupled Device), etc. can be cited. Also, in the case of implementing a CMOS sensor, a device (component) equivalent to the image sensor 22 can be constructed which also includes a analog/digital converter equivalent to the A/D converter 23 discussed next.

By inputting an imaging signal output from the image sensor 22 into an A/D converter 23, the signal is converted into a digital signal and input into a signal processor 24.

The signal processor 24 is composed of a DSP (Digital Signal Processor), and performs given signal processing in accordance with a program on a digital imaging signal output from the A/D converter 23.

For example, the signal processor 24 may acquire a digital imaging signal output from the A/D converter 23 in units equivalent to single still images (frame images). By performing given signal processing on an imaging signal in still image units acquired in this way, imaged image data, which is image signal data equivalent to one still image (imaged still image data), is generated.

Also, in the case of the present embodiment, the signal processor 24 is configured to be able to execute image processing for a subject detection process which, as discussed later, uses imaged image data acquired in this way. This point will be later described more fully.

At this point, in the case where imaged image data generated by the signal processor 24 as above is to be recorded to a memory card 40, i.e., a recording medium, as image information, imaged image data corresponding to a single still image, for example, is output from the signal processor 24 to an encoder/decoder 25.

The encoder/decoder 25 executes compression coding according to a given still image compression coding format with respect to imaged image data in still image units output from the signal processor 24, and then applies a header, etc. in accordance with control by the controller 27, for example, and converts the data to an image data format compressed in the given format. Then, the image data generated in this way is transferred to a media controller 26. The media controller 26, following control by the controller 27, causes transferred image data to be written and recorded to the memory card 40. The memory card 40 in this case has an external shape in a card format conforming to a given standard, for example. Internally, the memory card 40 is a recording medium adopting a configuration provided with a non-volatile semiconductor memory element such as flash memory. However, the recording medium that records image data may also be taken to have a type, shape, etc. that is other than the above memory card.

Also, the digital still camera 1 is taken to be able to display the image currently being imaged, called the through-the-lens image, by causing a display unit 33 to execute image display using imaged image data obtained by the signal processor 24. For example, in the signal processor 24, an imaging signal output from the A/D converter 23 is acquired and imaged image data equivalent to one still image is generated as described earlier, and by continuing this operation, imaged image data equivalent to frame images in a video are successively generated. Then, the imaged image data successively generated in this way is transferred to a display driver 32 following control by the controller 27. In so doing, through-the-lens image display is conducted.

The display driver 32 generates a driving signal for driving the display unit 33 on the basis of imaged image data input from the signal processor 24 as above, and outputs it to the display unit 33. Thus, images based on imaged image data in still image units will be successively displayed on the display unit 33. If the user views this, the images being imaged at that time will be displayed on the display unit 33 as a video. In other words, a through-the-lens image is displayed.

Also, the digital still camera 1 is taken to be able to play back image data recorded to the memory card 40 and cause that image to be displayed by the display unit 33.

In order to do so, the controller 27 specifies image data and issues a command for the media controller 26 to read data from the memory card 40. In response to this command, the media controller 26 accesses and reads out data from the addresses in the memory card 40 where the specified image data is recorded, and transfers the read-out data to the encoder/decoder 25.

The encoder/decoder 25, following control by the controller 27, for example, extracts object data in the form of compressed still image data from the imaged image data transferred from the media controller 26, executes a decoding process with respect to the compression coding of the compressed still image, and obtains imaged image data corresponding to a single still image. Then, this imaged image data is transferred to the display driver 32. Thus, an image of imaged image data recorded to the memory card 40 is played back and displayed on the display unit 33.

A user interface image (operable image) may also be displayed on the display unit 33 together with the above through-the-lens image or a playback image of image data, etc. In this case, it is configured such that the controller 27 generates image data for displayed as a necessary user interface image according to the operational state, etc. at that time, for example, and outputs it to the display driver 32. Thus, a user interface image is displayed on the display unit 33. Herein, it is possible for this user interface image to be displayed on a specific menu screen or other such display screen on the display unit 33 separately from a monitor image or a playback image of imaged image data, for example. It is also possible for this user interface image to be displayed partially overlaid or composited onto a monitor image or a playback image of imaged image data.

The controller 27 consists of a CPU (Central Processing Unit), and together with ROM 28, RAM 29, etc., constitutes a microcontroller. The ROM 28 stores programs to be executed by the CPU given by the controller 27, as well as various settings information, etc. related to operation of the digital still camera 1, for example. The RAM 29 is taken to be a primary storage apparatus for the CPU.

Also, in this case flash memory 30 is provided as a non-volatile storage area used in order to store various settings information, etc. which needs to be modified (updated) according to user operations or operational history, etc., for example. However, in the case where non-volatile memory such as flash memory, for example, is adopted for the ROM 28, it may also be configured such that a partial storage area in the ROM 28 is used instead of the flash memory 30.

Herein, in the case of the present embodiment, the controller 27 conducts control/processing to realize a subject search that searches for a subject near the digital still camera 1 by causing subject detection to be executed by the signal processor 24 while varying the imaging field, an optimal composition determination that determines, according to a given algorithm, a composition regarded as optimal according to the state of a subject detected by the subject search, composing that takes as a target composition a composition regarded as optimal which has been computed by the optimal composition determination, and automatic recording of an imaged image after the composing. This will be discussed later.

The operable unit 31 collectively refers to various operable elements provided on the digital still camera 1, and to an operation information signal output member that generates an operation information signal according to operations conducted on these operable elements, and outputs it to the controller 27. The controller 27 executes given processing according to an operation information signal input from the operable unit 31. Thus, operation of the digital still camera 1 is executed according to user operations.

The platform-compatible communication unit 34 is a member that executes communication between the platform 10 and the digital still camera 1 in accordance with a given communication format, and for example consists of a physical layer configuration for enabling communication signals to be sent to and received from a communication unit in the platform 10 while in a state where the digital still camera 1 is attached to the platform 10, and a configuration for realizing communication processing corresponding to a given layer above the physical layer. In correspondence with FIG. 2, a connector member connected to the connector 14 is included in this physical layer configuration.

Also, in the case of this example, the respective connectors above are provided with not only terminals for exchanging communication signals, but also with terminals for transferring charging power to enable charging from the platform 10. Although omitted from illustration, the digital still camera 1 is provided with a battery installation unit for removably installing a battery, and it is configured such a battery installed in this installation unit is charged based on power transferred from the platform 10.

[1-3. Platform]

Figure 8:
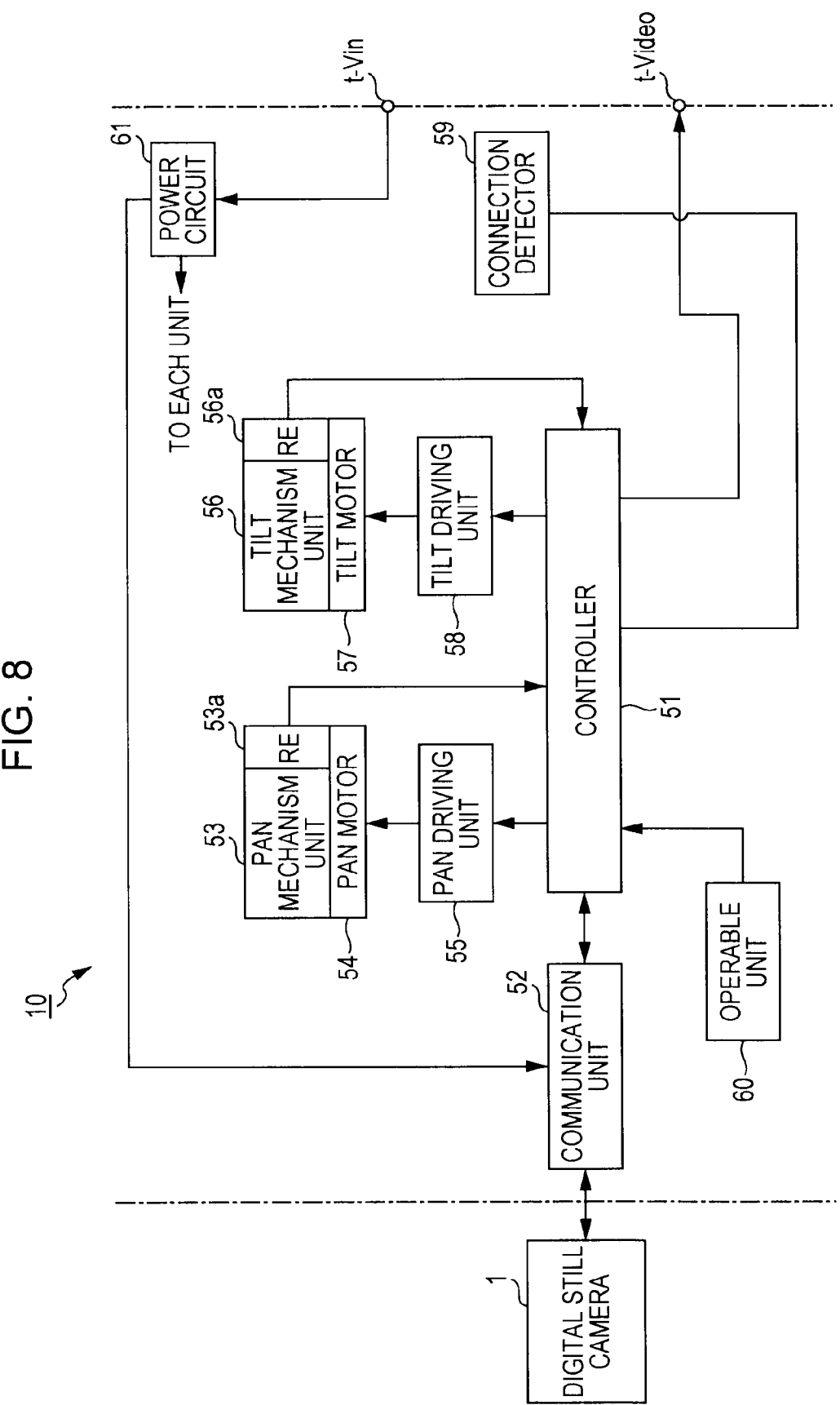
FIG. 8 is a block diagram illustrating an exemplary internal configuration of a platform.

The block diagram in FIG. 8 illustrates an exemplary internal configuration of the platform 10.

First, the power terminal unit t-Vin and the video terminal unit t-Video illustrated in the previous FIG. 6 are also illustrated in FIG. 8.

As illustrated, power input via the power terminal unit t-Vin is supplied as required operational power for the respective units of the platform 10 after passing through a power circuit 61. Also, charging power for the digital still camera 1 is generated in the power circuit 61, and the charging power is supplied to the digital still camera 1 via a communication unit 52 (connector).

Also, a video signal transmitted from the digital still camera 1 is supplied to the video terminal unit t-Video via the communication unit 52 and controller 51.

Herein, the operational power for each unit of the platform 10 is illustrated in the drawing as being supplied only via the power input terminal t-Vin, but in practice the platform 10 may be provided with a battery installation unit and configured such that operational power for each unit can be supplied from a battery installed in the installation unit.

Also, the platform 10 of the present embodiment is provided with a connection detector 59 for detecting whether or not a cable is connected to the power terminal unit t-Vin or the video terminal unit t-Video. For a specific configuration of a mechanism that detects the presence of a cable connection, a configuration wherein a switch toggles ON/OFF according to a cable being connected/removed may be cited, for example. In the present embodiment, the connection detector 59 may be configured to output a detection signal for identifying cable connection/removal, and its specific configuration should not be particularly limited.

Detection signals from the connection detector 59 (a detection signal for the power terminal unit t-Vin and a detection signal for the video terminal unit t-Video) are supplied to a controller 51.

Also, in FIG. 8, the platform 10 is provided with a pan/tilt mechanism as discussed earlier, the corresponding members being a pan mechanism unit 53, a pan motor 54, a tilt mechanism unit 56, and a tilt motor 57.

The pan mechanism unit 53 is composed of a mechanism for imparting motion in the pan (horizontal, left/right) direction illustrated in FIG. 4 to a digital still camera 1 attached to the platform 10. The motion of this mechanism is obtained by the pan motor 54 rotating in the opposite direction. Similarly, the tilt mechanism unit 56 is composed of a mechanism for imparting motion in the tilt (vertical, up/down) direction illustrated in FIG. 5 to a digital still camera 1 attached to the platform 10. The motion of this mechanism is obtained by the tilt motor 57 rotating in the opposite direction.

The controller 51 is composed of a microcontroller formed by the combination of, for example, a CPU, ROM, RAM, etc., and controls the motion of the pan mechanism unit 53 and the tilt mechanism unit 56. For example, when controlling the motion of the pan mechanism unit 53, the controller 51 outputs to a pan driving unit 55 a signal indicating a direction in which to move and a translational speed. The pan driving unit 55 generates a motor driving signal corresponding to the input signal, and outputs it to the pan motor 54. This motor driving signal may be a pulse signal corresponding to PWM control if the motor is a stepping motor, for example.

In accordance with this motor driving signal, the pan motor 54 rotates in a required rotational direction and rotational speed, for example, and as a result, the pan mechanism unit 53 is also driven so as to move in a translational direction and a translational speed corresponding thereto.

Similarly, when controlling the motion of the tilt mechanism unit 56, the controller 51 outputs to a tilt driving unit 58 a signal indicating a translational direction and a translational speed required by the tilt mechanism unit 56. The tilt driving unit 58 generates a motor driving signal corresponding to the input signal, and outputs it to the tilt motor 57. In accordance with this motor driving signal, the tilt motor 57 rotates in a required rotational direction and rotational speed, for example, and as a result, the tilt mechanism unit 56 is also driven so as to move in a translational direction and speed corresponding thereto.

Herein, the pan mechanism unit 53 is provided with a rotary encoder (rotation detector) 53a. In response to rotary motion of the pan mechanism unit 53, the rotary encoder 53a outputs to the controller 51a detection signal which indicates the angular magnitude of that rotation. Similarly, the tilt mechanism unit 56 is provided with a rotary encoder 56a. In response to rotary motion of the tilt mechanism unit 56, the rotary encoder 56a likewise outputs to the controller 51a signal which indicates the angular magnitude of that rotation.

Thus, the controller 51 is configured to be able to acquire (monitor) in real-time the rotational angular magnitudes of the pan mechanism unit 53 and the tilt mechanism unit 56 while in operation.

Figure 13:
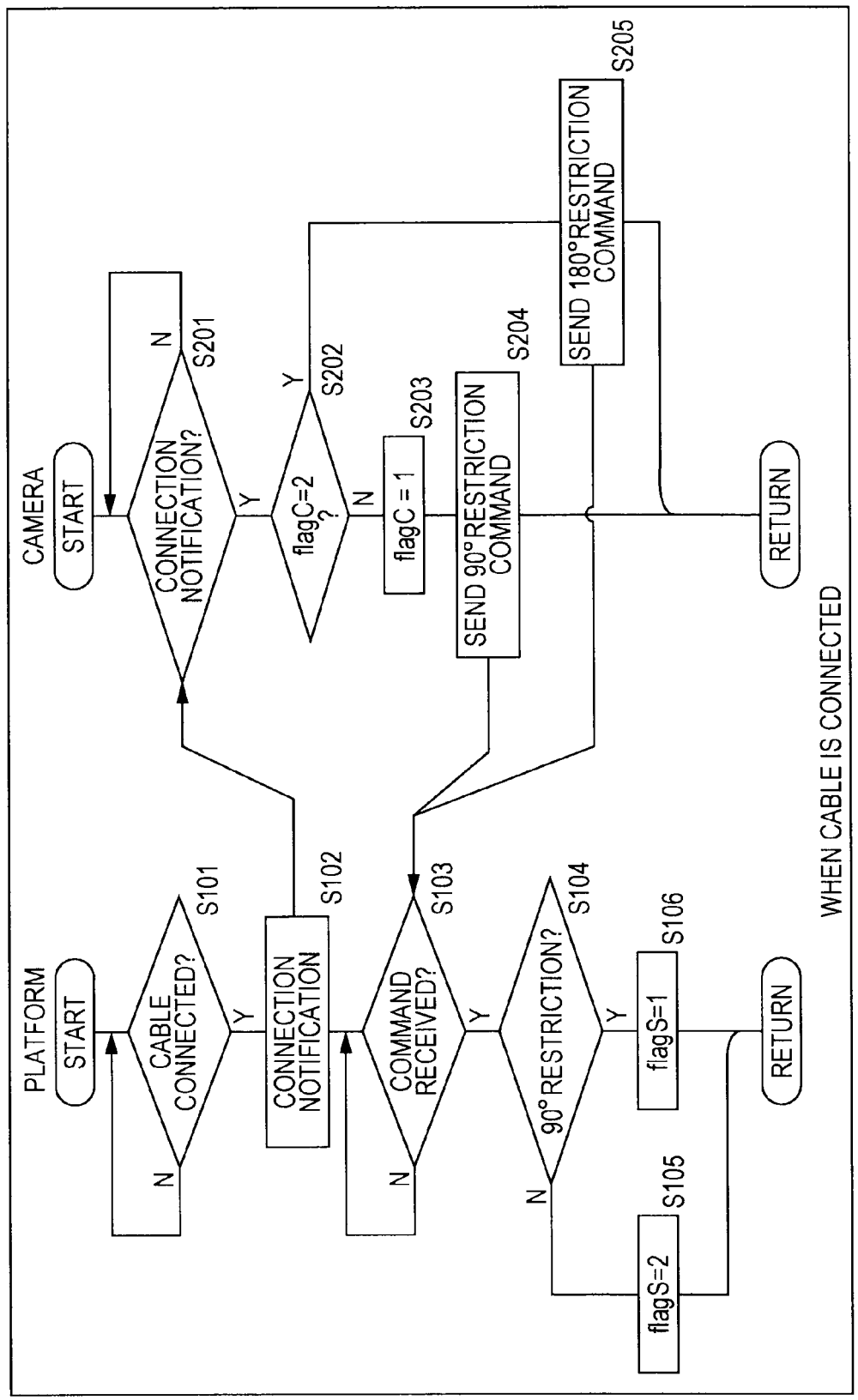
FIG. 13 is a flowchart illustrating a processing sequence to be executed when cables are connected.
Figure 15:
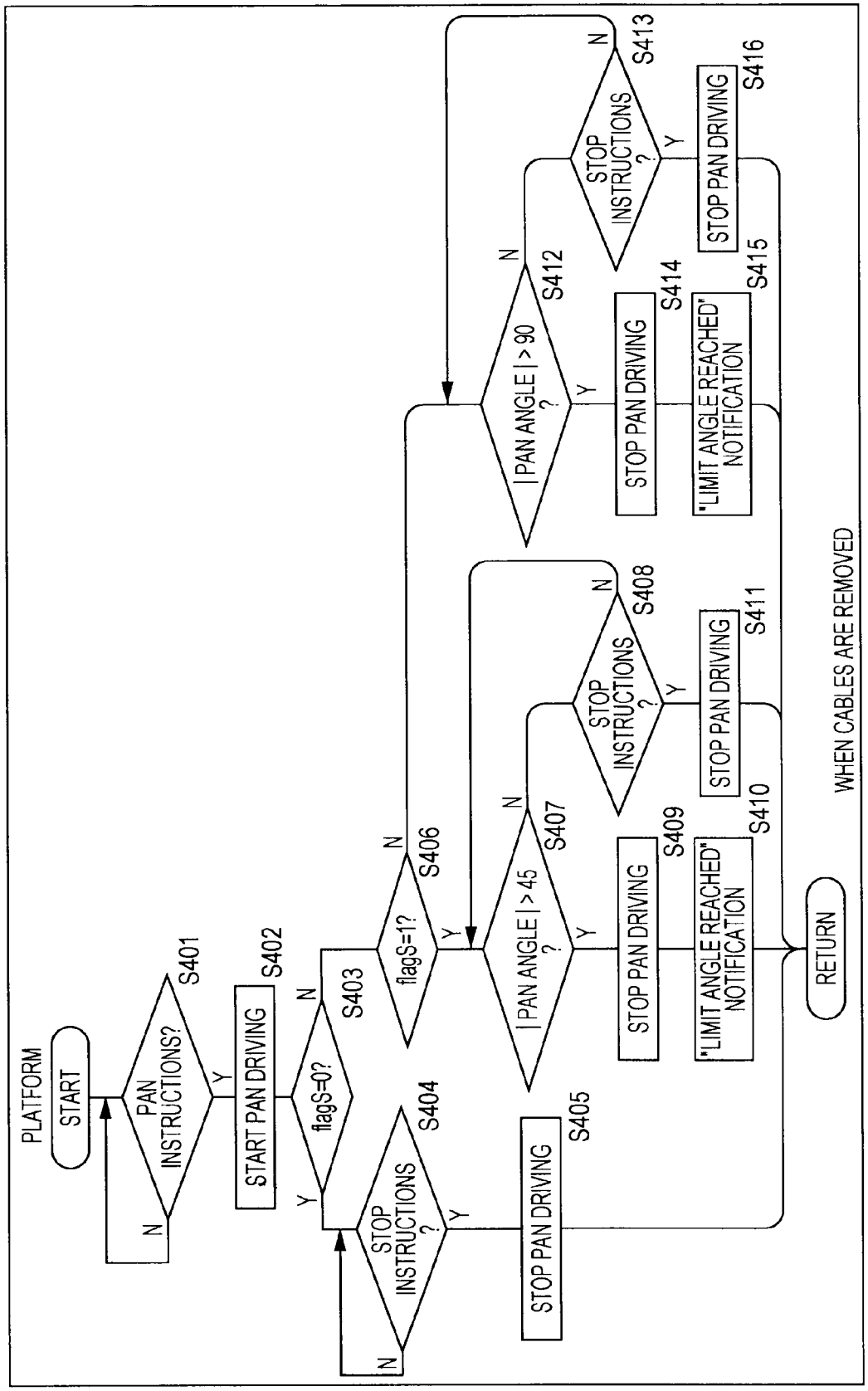
FIG. 15 is a flowchart illustrating a processing sequence to be executed at a platform during automatic imaging operations.

Also, in the present embodiment, the controller 51 executes the processes illustrated in FIG. 13 and FIG. 15, etc. based on detection signals supplied from the connection detector 59 discussed above. This will be discussed later.

The communication unit 52 is a member that communicates with the platform-compatible communication unit 34 in a digital still camera 1 attached to the platform 10 in accordance with a given communication format. Similarly to the platform-compatible communication unit 34, the communication unit 52 consists of a physical layer configuration for enabling communication signals to be sent to and received from a peer communication unit by wired or wireless communication, and a configuration for realizing communication processing corresponding to a given layer above the physical layer. In correspondence with FIG. 2, the connector 14 of the camera seat 12 is included in this physical layer configuration.

The operable unit 60 collectively refers to an operable element, specifically the menu button 60a illustrated in the earlier FIGS. 4 and 6, and to an operation information signal output member that generates an operation information signal according to operations conducted on this operable element, and outputs it to the controller 51. The controller 51 executes given processing according to an operation information signal input from the operable unit 60.

Meanwhile, behavior when the menu button 60a is operated will be discussed later.

[1-4. Automatic Imaging Operations Conducted by Automatic Composing]

Herein, by the respective operations of the subject search, optimal composition determination, and composing discussed earlier, an imaging system of the present embodiment is taken to conduct automatic composing that takes as a target composition a composition regarded as optimal which has been determined according to the state of a subject detected by the subject search.

Hereinafter, the specific content of the automatic imaging operations that accompany such automatic composing operations will be described.

First, in order to conduct automatic composing as above, subject detection results from the signal processor 24 illustrated in FIG. 7 are used.

The signal processor 24 executes processing like the following as a subject detection process.

Namely, the signal processor 24 detects image portions corresponding to human faces from image signal data equivalent to one still image that has been acquired as described earlier. Specifically, in a subject detection process in the case of this example, what is called face detection technology is used to set a face frame corresponding to the area of the facial image portion for each subject detected in an image. Moreover, from information on the number, size, position, etc. of the face frames, information on the number of subjects in the frame, the size of each subject, and their respective positions in the frame is obtained.

Although several face detection techniques are known, the present embodiment is not particularly limited in which detection technique to adopt, and may be configured such that an appropriate format is adopted while taking detection precision, design difficulty, etc. into account.

Also, the signal processor 24 is configured to execute a subject detection process as above at a predetermined interval of a given number of frames, such as every set of image signal data equivalent to one still image (or in other words, every frame).

Figure 9:
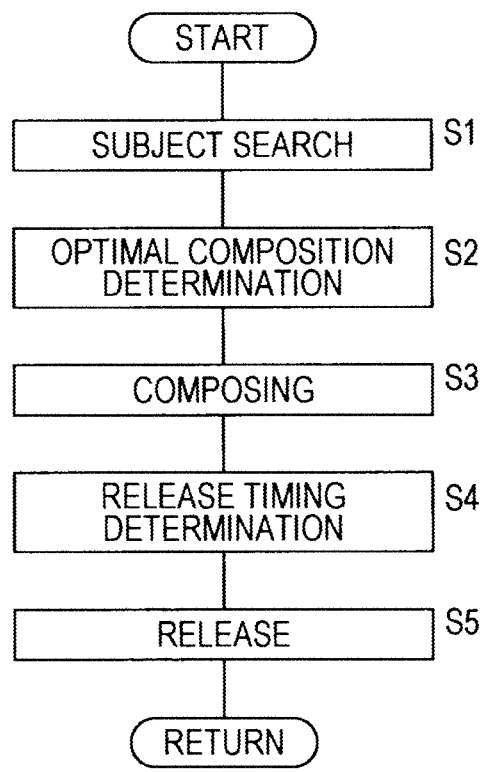
FIG. 9 is a flowchart for explaining the flow of automatic imaging operations conducted by automatic composing.

FIG. 9 is a flowchart illustrating the general flow of automatic imaging operations conducted by automatic composing, which is conducted using the results of a subject detection process like the above.

In order to conduct automatic composing, detection information from a subject detection process like the above is used to first conduct a search for a subject existing near the digital still camera 1 (step S1 in the drawing).

Specifically, this subject search involves causing the signal processor 24 to execute subject detection while varying the imaging field selection angle as a result of the controller 27 in the digital still camera 1 conducting a pan/tilt control with respect to the platform 10 and a zoom control with respect to the optics 21.

Such a subject search process ends in response to obtaining a state in which a subject has been detected in the frame by the subject detection process conducted by the signal processor 24.

After the subject search process ends, the controller 27 conducts an optimal composition determination process (S2). Specifically, a determination of the image construction based on the subject detection results from the signal processor 24 is conducted (in this case, a determination of the number of subjects in the frame, the subject sizes, and the subject positions, etc.), and then a composition regarded as optimal is determined in accordance with a given algorithm on the basis of image construction information determined by the image construction determination. At this point, as also understood from the earlier explanation, the composition in this case is determined by the respective pan/tilt/zoom imaging field selection angles. Consequently, according to this optimal composition determination process, there is obtained information on the respective pan/tilt/zoom imaging field selection angles regarded as optimal according to subject detection results (the state of a subject inside the frame).

After executing an optimal composition determination process as above, the controller 27 conducts composing control (S3). In other words, pan/tilt/zoom control is conducted while taking the optimal composition as a target composition.

Specifically, the composing control involves the controller 27 instructs the controller 51 of the platform 10 with information on the respective pan/tilt imaging field selection angles computed by the optimal composition determination process.

In response, the controller 51 computes translational magnitudes of the pan mechanism unit 53 and the tilt mechanism unit 56 in order to orient the digital still camera 1 in the imaging direction obtained by the instructed, respective pan/tilt imaging field selection angles. The controller 51 supplies a pan control signal to the pan motor 54 and a tilt control signal to the tilt motor 57 such that pan driving and tilt driving for the computed translational magnitudes is conducted.

Also, the controller 27 instructs the optics 21 with information on an imaging field selection angle for the zoom computed by the optimal composition determination process (or in other words, information on the angle of view), thereby causing zoom control to be executed by the optics 21 such that the instructed angle of view is obtained.

Then, in the case where the composing operations based on the composing control are completed and the composition regarded as optimal has been obtained, the controller 27 conducts a release timing determination process (S4).

Herein, in this example, release is not immediately conducted in response to an optimal composition being obtained, but is instead configured such that release is conducted with a final condition being that a given state, such as a subject smiling, for example, is obtained. Determining whether or not such a final condition has been established is the release timing determination process.

In the case where the final condition (release condition) is taken to have been established by the release timing determination process, the automatic recording imaged image data is conducted as the release process in step S5. Specifically, the controller 27 controls the encoder/decoder 25 and the media controller 26 to execute recording of imaged image data obtained at that time to the memory card 40.

In an imaging system of the present embodiment configured as above, automatic imaging operations conducted by automatic composing are realized on the basis of control/processing by the controller 27.

However, although omitted from illustration in FIG. 9 in order to simplify explanation, the composing in step S3 may fail in some cases because, for example, a subject was not detected, etc. during composing. In such cases, the subject search in step S1 is reattempted.

Similarly, there are potential cases where the release timing is not found to be satisfactory in the release timing determination process in step S4. In such cases, the process is likewise reattempted starting from the subject search in step S1. Ordinarily, however, the release timing determination process is a process that determines whether or not a release condition such as the above smiling, etc. is established within a given amount of time.

[1-5. Setting a Rotational Angle]

Herein, in the present embodiment, it is configured such that the user can selectively set a search range in the horizontal direction (pan direction) regarding a subject search conducted as part of automatic imaging operations conducted by automatic composing as above.

When setting a search range in the horizontal direction (or in other words a rotational angle range in the pan direction) for use during a subject search in this way, the user causes a menu screen related to automatic imaging operations to be displayed on the display unit 33 by pressing the menu button 60a provided on the platform 10.

Although explanation by illustration is omitted, icons are respectively displayed on the menu screen that is displayed in response to operation of the menu button 60a. The icons represent respective items for setting the shooting frequency conducted by the automatic imaging operations discussed above, whether the use of flash is allowed/disallowed, and the rotational angle range in the pan direction during the above subject search.

When setting a search range in the horizontal direction for use during a subject search, the user conducts an operation that selects the icon representing the item for setting the rotational angle range. Specifically, in the case of this example, the user uses the touch panel built in with the display screen unit 33a in the display unit 33 to perform a touch operation on the icon representing the item for setting the rotational angle range.

Figure 10:
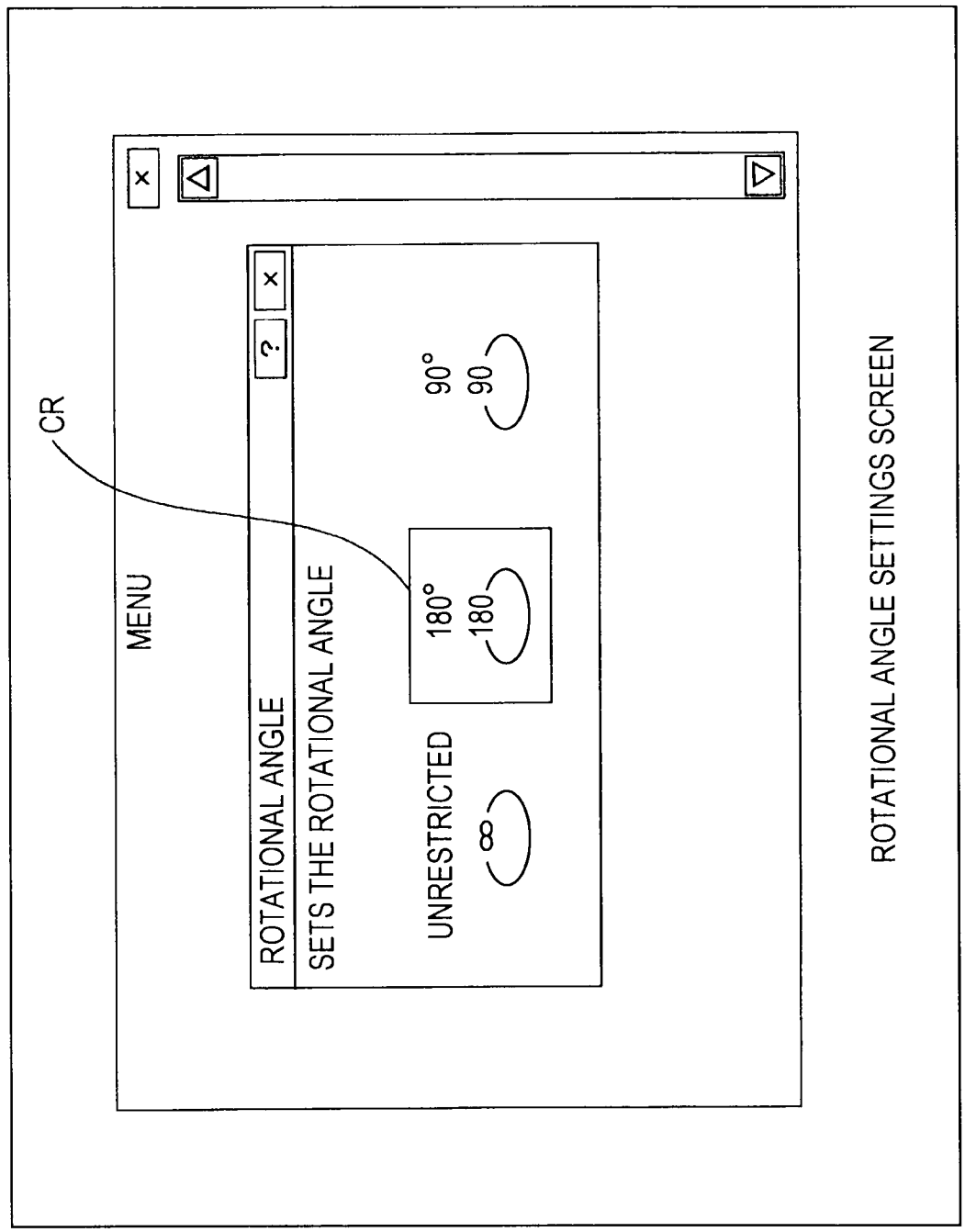
FIG. 10 is a diagram illustrating an exemplary rotational angle settings screen (when the angle range is unrestricted).

FIG. 10 illustrates a rotational angle settings screen that is displayed in response to operation (selection) of an icon representing an item for setting the rotational angle range on the menu screen.

In the case of this example, the rotational angle range is configured to be selectable from among three predetermined types. Specifically, the rotational angle range is selectable from among the three types of "Unrestricted", "180°", and "90°", and correspondingly, icons that respectively represent these three rotational angle ranges are displayed on the rotational angle settings screen as illustrated in the drawing. Also, a cursor CR is also displayed on the rotational angle settings screen in order to indicate the selected rotational angle range.

By performing a touch operation on the icon representing a desired rotational angle range from among these icons, the user is able to instruct the digital still camera 1 to set that rotational angle range.

Stated herein for certainty, the "180°" rotational angle range refers to a ±90° range taking the pan reference position (0°) illustrated in the earlier FIG. 4 as a reference (in FIG. 4, a range from 90° to 0° to 270°). Similarly, the "90°" rotational angle range is a ±45° range taking the pan reference position (0°) as a reference (a range from 45° to 0° to 315°).

Meanwhile, although in the above explanation the display of a menu screen is taken to be conducted in response to operation of a menu button 60a provided on the platform 10, the menu screen may also be made to be displayed according to an operation using the GUI of the digital still camera 1.

<2. Rotational Angle Restriction Technique According to Embodiment>

[2-1. Specific Examples of Operation]

As also understood from the foregoing explanation, in an imaging system of the present embodiment, a power terminal unit t-Vin and a video terminal unit t-Video are formed on the platform 10 in order to enable charging with respect to the digital still camera 1 and external output of playback images, etc. from the digital still camera 1. Additionally, these terminal units t are not formed on the pedestal 15 (in other words, the stationary part) of the platform 10, but rather on the main unit 11 which is a movable unit in order to rotationally drive the digital still camera 1 in the pan direction.

In the case where terminal units t (cable ports) are provided on the main unit 11 which is the movable part during pan driving in this way, there is a risk of a situation where cables connected to the terminal units t wrap around the platform 10 when panning is driven in accordance with a subject search, etc. In some cases, the platform 10 may rise up due to the stress of the cables and fall over. In any case, intended imaging operations cannot be performed and imaging operation itself is impeded.

Thus, in the present embodiment, it is configured such that the rotational angle range in the pan direction is restricted on the basis of the results of detecting whether or not cables are connected to the terminal units t.

Figure 11:
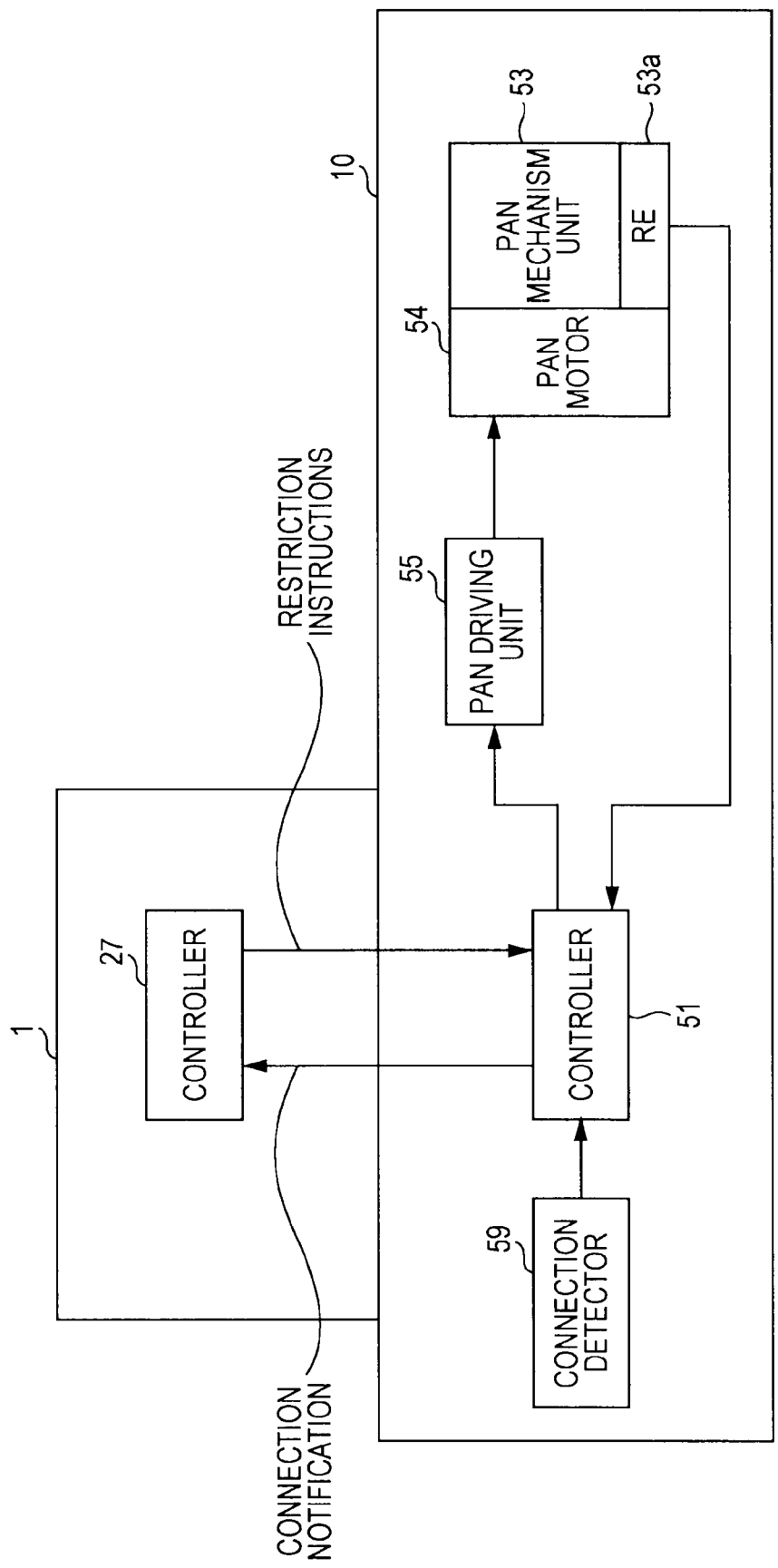
FIG. 11 is a diagram illustrating a signal exchange format for realizing restriction of a rotational angle range based on whether or not cables are connected.

FIG. 11 is a diagram illustrating an actual signal exchange format in an imaging system for realizing such restriction of a rotational angle range based on whether or not cables are connected.

Herein, in FIG. 11, the connection detector 59, the controller 51, the pan driving unit 55, the pan motor 54, the pan mechanism unit 53, and the rotary encoder 53a in the platform 10 are illustrated, and the controller 27 in the digital still camera 1 is illustrated.

As also described in the earlier FIG. 8, in the platform 10, a detection signal is supplied from the connection detector 59 to the controller 51. The controller 51 issues a connection notification to the controller 27 in the digital still camera 1 in the case of being supplied with a signal indicating that a cable has been connected in the form of at least one of the detection signals from among the detection signal for the power terminal unit t-Vin and the detection signal for the video terminal unit t-Video from the connection detector 59.

When the connection notification is issued, the controller 27 instructs the controller 51 in the platform 10 to restrict the rotational angle range in the pan direction.

Herein, as described with reference to the earlier FIG. 10, in this example a rotational angle range in the pan direction is selectable from among "Unrestricted", "180°", and "90°". In other words, one of these is set as the rotational angle range at the timing when cables are connected.

In order to prevent the occurrence of problems such as cable wrapping or the platform 10 rising up and falling over, the rotational angle range should be restricted to within a given allowable angle range that is preset as one with no risk of the above problems occurring. In the case of this example, "180°" is determined as the allowable angle range for which there is no risk of the above problems occurring if the rotational angle range is within "180°".

Consequently, in the case of this example, it is configured such that the rotational angle range is restricted to a range that is narrow than the set range in response to the connection notification being issued only in the case where the rotational angle range setting at the time was "Unrestricted".

Specifically, in the case where the connection notification is issued, the controller 27 first checks the current rotational angle range setting, and in the case where the current rotational angle range is "Unrestricted", instructs the controller 51 to restrict the rotational angle range to an angle range that is within the allowable angle range. In the case of this example, when restricting the rotational angle range from a state where "Unrestricted" is set in this way, the "90°" rotational angle range is specified so that a sufficient margin will be obtained.

In contrast, it is configured such that the current rotational angle range setting is maintained in the case where the connection notification is issued but the current rotational angle range setting is other than "Unrestricted". Specifically, the controller 51 is instructed with the "180°" rotational angle range in the case where the current rotational angle range setting is "180°", and with the "90°" rotational angle range in the case where the current rotational angle range setting is "90°".

In so doing, it is configured such that in the case where a rotational angle range set by a user was within a given allowable angle range (within 180° in the case of this example), that rotational angle range setting is maintained.

Once a rotational angle range has been specified by the controller 27 in response to a cable connection as above, the controller 51 of the platform 10 conducts a control such that the rotational angle range in the pan direction is restricted to the specified rotational angle range with respect to executing a subject search.

Herein, when initiating a subject search, pan driving initiation instructions are issued to the controller 51 by the controller 27 of the digital still camera 1. In response to the initiation instructions, the controller 51 instructs the pan driving unit 55 to initiate driving of the pan mechanism unit 53.

From this point, the controller 51 initiates pan driving in response to instructions from the controller 27 issued when a subject search is initiated in this way, and thus monitoring of rotational angle magnitude information from the rotary encoder 53a provided on the pan mechanism unit 53 is initiated. Then, in the case where the rotational angle magnitude reaches the upper limit value of the specified rotational angle range, pan driving stop instructions are issued to the pan driving unit 55. Thus, the rotational angle in the pan direction during a subject search is limited so as to not exceed the specified rotational angle range.

Herein, as also discussed earlier, a subject search ends in response to a subject being detected inside the frame, and in that case pan driving stop instructions are issued to the controller 51 by the controller 27. In other words, in the case where such pan driving stop instructions are issued due to a subject search ending before the rotational angle magnitude reaches the upper limit value of the specified rotational angle range, the controller 51 issues driving stop instructions to the pan driving unit 55 at that time.

Also, in the present embodiment, it is configured such that the displayed content of the rotational angle settings screen illustrated in the earlier FIG. 10 is modified in response to entering a state where the rotational angle range should be restricted because of cables being connected.

Figure 12:
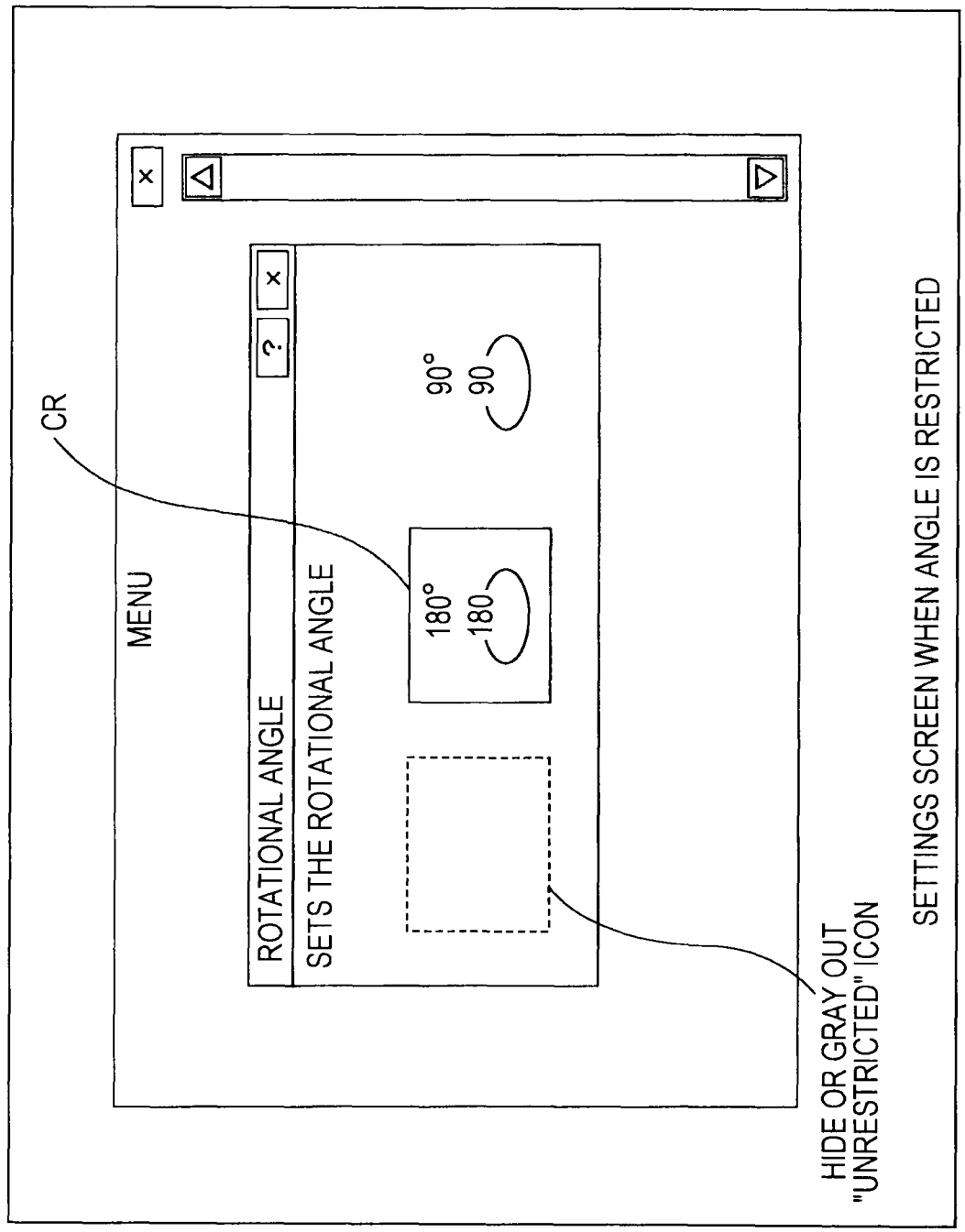
FIG. 12 is a diagram illustrating an exemplary rotational angle settings screen (when the angle range is restricted).

FIG. 12 illustrates an exemplary display of a rotational angle settings screen during angle restriction.

As illustrated in FIG. 12, when displaying a rotational angle settings screen while in a state where cables are connected and the rotational angle range should be restricted, the "Unrestricted" icon is hidden or grayed out, etc. on the rotational angle settings screen, such that the "Unrestricted" icon becomes non-selectable.

In so doing, accidental setting of a rotational angle range that is outside the allowable range during a state where cables are connected can be prevented.

Also, the restricted state of the rotational angle range is cancelled in the case where cables are removed. Specifically, when the respective detection signals for the power terminal unit t-Vin and the video terminal unit t-Video supplied from the connection detector 59 both become signals indicating a state where a cable has been removed, the controller 51 issues a notification indicating such (called a disconnection notification) to the controller 27 in response. Accordingly, the controller 27 issues instructions to the controller 51 for cancelling the restriction on the rotational angle range.

Specifically, in the case of this example, the controller 27 instructs the controller 51 with the "Unrestricted" rotational angle range in response to the disconnection notification being issued. In other words, the "Unrestricted" rotational angle range is set in response to cables being removed, without particular regard for the rotational angle range that had been set before angle range restriction was conducted due to a cable connection.

In the present embodiment as above, it is configured such that the rotational angle range in the pan direction is restricted to within a given allowable angle range on the basis of results determining whether or not cables are connected to the terminal units t. In so doing, problems such as cable wrapping or the platform 10 rising up and falling over can be effectively prevented from occurring.

In other words, in an imaging system that conducts automatic imaging operations using pan driving, it can be thus configured such that imaging operations are not impeded by the above cable wrapping, etc.

[2-2. Processing Sequences]

Next, specific processing sequences for realizing a rotational angle restriction technique according to the embodiment described as above will be described with reference to the flowcharts in FIGS. 13 to 17.

Herein, in these flowcharts in FIGS. 13 to 17, processes indicated as "Camera" represent processes which the controller 27 illustrated in FIG. 7 executes by following a program stored in the ROM 28, for example. Also, processes indicated as "Platform" represent processes which the controller 51 illustrated in FIG. 8 executes by following a program stored in internal ROM, etc., for example.

First, processing sequences by both the camera and the platform to be executed when cables are connected will be described with FIG. 13.

First, at the platform, the process is configured to stand by until cables are connected, according to the processing in a step S101. In other words, processing for determining whether or not cables have been connected is repeated until a determination result indicating that cables have been connected is obtained.

Specifically, in step S101, it is determined whether or not at least one of the respective detection signals for the power terminal unit t-Vin and the video terminal unit t-Video supplied by the connection detector 59 indicates that a cable has been connected. Then, the processing in step S101 is executed again in the case where, as a result of the determination, a negative result is obtained which indicates that neither of the detection signals indicate that a cable has been connected and thus no cable has been connected.

Then, the process proceeds to a step S102 in the case where a positive result is obtained which indicates that one of the detection signals indicates that a cable has been connected and thus a cable has been connected.

In step S102, a connection notification is issued to the camera (the controller 27).

At the platform, after issuing the connection notification, the process proceeds to a step S103 as illustrated.

At the camera, the process is configured to stand by for a connection notification from the platform in step S102, according to the processing in a step S201. In other words, in step S201, processing for determining whether or not the connection notification exists is repeated until a determination result indicating that the connection notification exists is obtained.

Then, in the case where a positive result in which the connection notification exists is obtained in step S201, the process proceeds to a step S202 and determines whether or not flagC=2 is true.

Herein, "flagC" is an identifier that the controller 27 records/updates in order to identify the state of the current rotational angle range setting in the camera. Specifically, in this case, flagC=0 is taken to represent "Unrestricted", flagC=1 is taken to represent "90°", and flagC=2 is taken to represent "180°".

Consequently, as also understood from this point, it is determined by the determination processing in step S202 whether or not the currently set rotational angle range is "180°".

In the case where a negative result is obtained in step S202 in which flagC=2 is not true, the process proceeds to a step S203, and after setting flagC=1, processing for sending a 90° restriction command is executed in a step S204.

In other words, in the case where flagC=2 is not true (or in other words, when the currently set rotational angle range is "Unrestricted" or "90°"), a command specifying the "90°" rotational angle range is sent to the controller 51.

In contrast, in the case where a positive result is obtained in step S202 in which flagC=2 is true, the process proceeds to a step S205 and processing for sending a 180° restriction command is executed. In other words, as described earlier, in the case where the "180°" rotational angle range has been set by a user, a command specifying the "180°" rotational angle range is sent to the controller 51 so that the "180°" setting will be maintained.

After executing the processing in step S204 or S205, the process reaches "RETURN" as illustrated (returns to step S201 at the beginning of the process).

At the platform, the process is configured to stand by until a command sent by step S204 or S205 is received, according to step S103.

Then, in the case where a positive result is obtained in step S103 in which a command was received, the process proceeds to a step S104 and determines whether or not a 90° restriction exists.

In the case where a negative result is obtained in step S104 in which a command received from the controller 27 is not the 90° restriction command sent in step S204, the process proceeds to a step S105 and flagS=2 is set.

Herein, "flagS" is an identifier that the controller 51 records/updates in order to identify the state of the current rotational angle range setting in the platform. Likewise with flagS, "0" is taken to represent "Unrestricted", "1" is taken to represent "90°", and "2" is taken to represent "180°".

Also, in the case where a positive result is obtained in step S104 in which a command received from the controller 27 is the 90° restriction command sent in step S204, the process proceeds to a step S106 and flagS=1 is set.

After executing the processing in step S105 or S106, the process reaches "RETURN" as illustrated (returns to step S101 at the beginning of the process).

Next, processes to be respectively executed at the camera and the platform during automatic imaging operations will be described with FIGS. 14 and 15.

Figure 14:
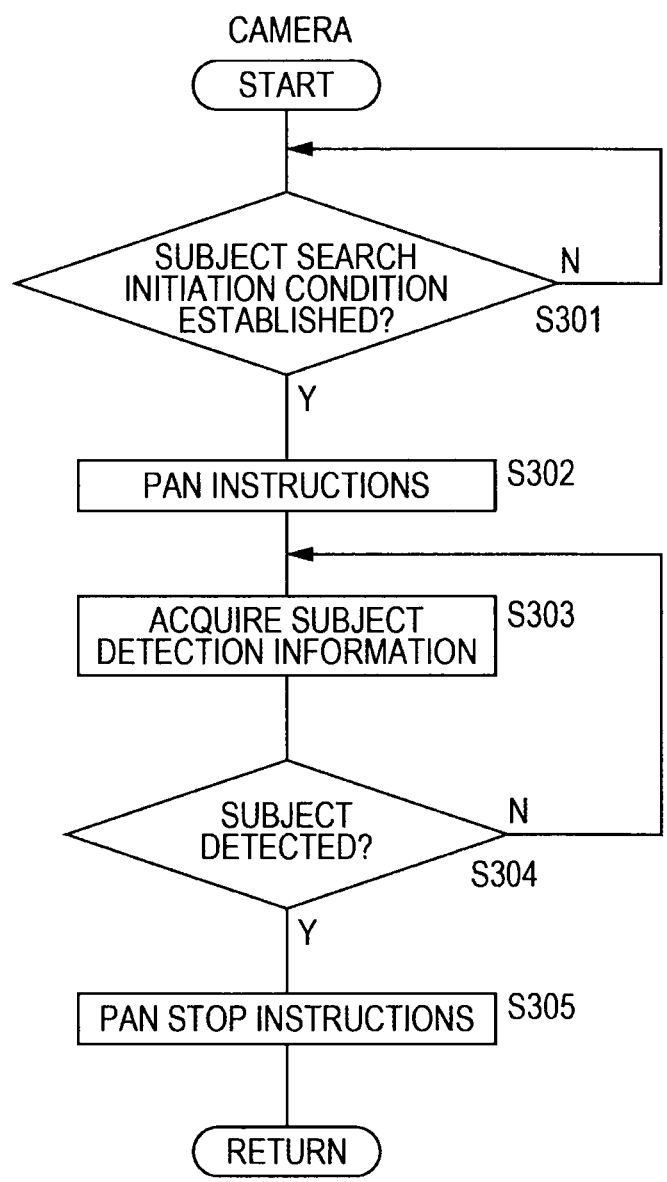
FIG. 14 is a flowchart illustrating a processing sequence to be executed at a digital still camera during automatic imaging operations.

FIG. 14 illustrates a processing sequence to be executed at the camera during automatic imaging operations.

In FIG. 14, the process is configured to first stand by in a step S301 until a subject search initiation condition is established. Herein, in this example, a subject search is to be initiated in response to a user issuing instructions for initiating automatic imaging operations conducted by automatic composing, for example. Also, as described with reference to the earlier FIG. 9, a subject search should also be initiated in response to a composing failure or when a satisfactory timing is not found by a release timing determination process.

The standby processing in step S301 involves determining whether or not a given condition has been established for which it is determined in advance that a subject search should be initiated, such as "automatic imaging operations initiation instructions by a user", "composing failure", or "satisfactory determination not obtained by release timing determination process", for example.

In the case where a positive result is obtained in step S301 in which a subject search initiation condition has been established, the process proceeds to a step S302, and pan instructions are issued to the controller 51.

Then, in a subsequent step S303, subject detection information is acquired from the signal processor 24 illustrated in FIG. 7 as a subject detection information acquisition process.

Furthermore, in the next step S304, it is determined whether or not a subject has been detected on the basis of the subject detection information acquired in step S303.

In the case where a negative result is obtained in step S304 in which a subject is not detected, the process returns to step S303. Thus, the information acquisition processing in step S303 and the determination processing in step S304 is repeated until a subject is detected inside the frame as part of a subject search.

Also, in the case where a positive result is obtained in step S304 in which a subject was detected, the process proceeds to a step S305 and pan stop instructions are issued to the controller 51.

In other words, the pan driving initiated in step S302 is stopped to end the subject search in response to a subject having been detected in this way.

After executing the pan stop instruction processing in step S305, the process reaches "RETURN" as illustrated.

Also, FIG. 15 illustrates a processing sequence to be executed at the platform during automatic imaging operations.

In FIG. 15, at the platform, the process is configured to first stand by until pan instructions are issued from the controller 27, according to the processing in step S401 of the drawing. In other words, the process stands by until the controller 27 issues pan instructions as the processing in step S302 in FIG. 14 because a subject search should be initiated.

In the case where a positive result is obtained in step S401 in which the pan instructions are issued, pan driving initiation processing is executed in a step S402. In other words, instructions initiating driving of the pan mechanism unit 53 (driving of the pan motor 54) are issued to the pan driving unit 55.

In a subsequent step S403, it is determined whether or not flagS=0 is true (or in other words, whether or not the current rotational angle range setting is "Unrestricted").

In the case where a positive result is obtained in step S403 in which flagS=0 is true, the process proceeds to a step S404 and stands by until stop instructions are issued from the controller 27. In other words, in the "Unrestricted" setting state, a subject search should be conducted until a subject is detected inside the frame, and thus in step S404, the process is configured to stand by for pan stop instructions (step S305) issued by the controller 27 in response to a subject being detected inside the frame in this way.

Additionally, in the case where a positive result is obtained in step S404 in which the pan stop instructions are issued, processing to stop pan driving is executed in a step S405. In other words, instructions stopping the driving of the pan mechanism unit 53 are issued to the pan driving unit 55.

After executing the stop processing in step S405, the process reaches "RETURN" as illustrated.

Also, in the case where a negative result is obtained in step S403 in which flagS=0 is not true, the process proceeds to a step S406 and determines whether or not flagS=1 is true (or in other words, whether or not the current rotational angle range setting is "90°").

In the case where a positive result is obtained in step S406 in which flagS=1 is true, the process proceeds to a step S407 and determines whether or not the absolute value of the pan angle (|pan angle|) is greater than 45. In other words, it is determined whether or not the current pan angle identified from information on the rotational angle magnitude obtained by the rotary encoder 53a exceeds a range of ±45° taking the pan reference position of 0° as a reference.

Then, in the case where a negative result is obtained in step S407 in which the absolute value of the pan angle is not greater than 45, the process proceeds to a step S408 and determines whether or not pan stop instructions have been issued from the controller 27. The process is configured to return to step S407 in the case where a negative result is obtained in this step S408 in which pan stop instructions have not been issued from the controller 27.

Herein, loop processing of steps S407 to S408 to S407 is formed in this way. With this loop processing, the process is configured to stand for the arrival of either a state where the absolute value of the pan angle is greater than 45, or a state where pan stop instructions have been issued from the controller 27.

In the case where a positive step is obtained in step S407 in which the absolute value of the pan angle is greater than 45, the process proceeds to a step S409 and executes processing to stop pan driving. Then, after issuing a "limit angle reached" notification to the controller 27 in a subsequent step S410, the process reaches "RETURN" as illustrated.

Also, in the case where a positive result is obtained in step S408 in which pan stop instructions are issued from the controller 27, the process reaches "RETURN" as illustrated after executing processing to stop pan driving in a step S411.

Also, in the case where a negative result is obtained in the above-described step S406 in which flagS=1 is not true (or in other words, in the case where the current rotational angle range setting is "180°"), the process proceeds to a step S412 and determines whether or not the absolute value of the pan angle (|pan angle|) is greater than 90. In other words, it is determined whether or not the current pan angle identified from information on the rotational angle magnitude obtained by the rotary encoder 53a exceeds a range of ±90° taking the pan reference position of 0° as a reference.

Then, in the case where a negative result is obtained in step S412 in which the absolute value of the pan angle is not greater than 90, the process proceeds to a step S413 and determines whether or not pan stop instructions have been issued from the controller 27. In the case where a negative result is obtained in this step S413 in which pan stop instructions have not been issued from the controller 27, the process is configured to return to step S412. Thus, loop processing of steps S412 to S413 to S412 is formed. With this loop processing, the process is configured to stand by for the arrival of either a state where the absolute value of the pan angle is greater than 90, or a state where pan stop instructions have been issued from the controller 27.

In the case where a positive result is obtained in step S412 in which the absolute value of the pan angle is greater than 90, the process proceeds to a step S414 and executes processing to stop pan driving. Then, the process reaches "RETURN" as illustrated after issuing a "limit angle reached" notification to the controller 27 in a subsequent step S415.

Also, in the case where a positive result is obtained in step S413 in which pan stop instructions are issued from the controller 27, the process reaches "RETURN" as illustrated after executing processing to stop pan driving in a step S416.

Figure 16:
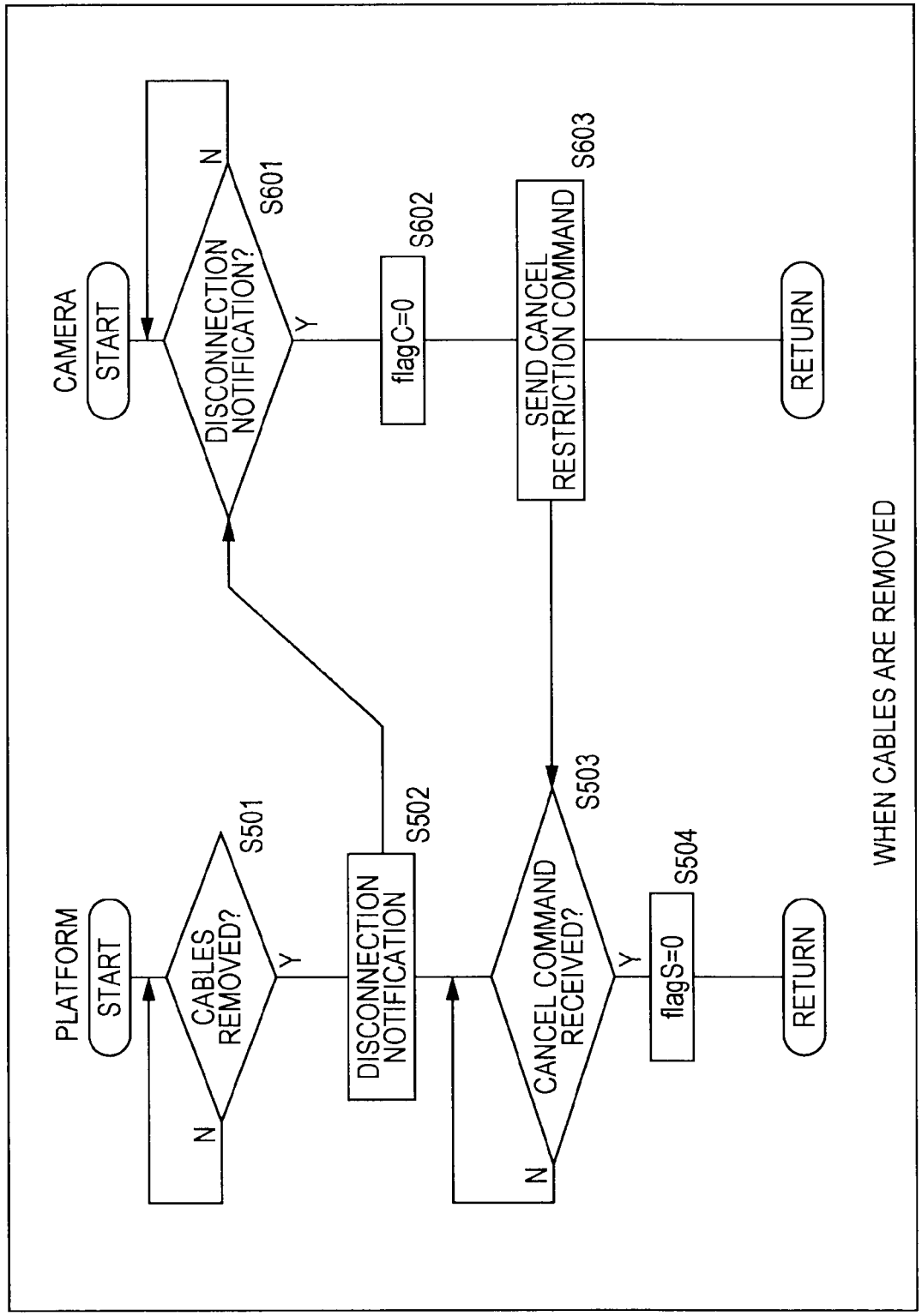
FIG. 16 is a flowchart illustrating a processing sequence to be executed when cables are removed.

Also, FIG. 16 illustrates respective processing sequences to be executed at the camera and the platform when cables are removed.

First, at the platform, the process is configured to stand by until cables are removed, according to step S501 in the drawing. In other words, processing to determine whether or not both of the respective detection signals for the power terminal unit t-Vin and the video terminal unit t-Video supplied by the connection detector 59 indicate that a cable has been removed is repeated until the respective detection signals both indicate that a cable has been removed.

In the case where a positive result is obtained in step S501 in which the respective detection signals both indicate that a cable has been removed, the process proceeds to a step S502 and issues a disconnection notification to the controller 27.

After executing the notification processing in step S502, the process proceeds to a step S503.

At the camera, the process is configured to stand by until the disconnection notification is issued from the platform, according to the processing in step S601 in the drawing. Then, in the case where the disconnection notification from the platform is issued and a positive result is obtained in step S601 indicating that a disconnection notification exists, the process proceeds to a step S602 and sets flagC=0. In other words, as discussed earlier, the rotational angle range is set to "Unrestricted" to cancel the restriction on the angle range in response to the cables being removed.

After setting flagC=0 in step S602, the process reaches "RETURN" as illustrated after sending a cancel restriction command to the controller 51 in a step S603.

At the platform, the process is configured to stand by until the cancel restriction command is received, according to the processing in step S503.

Then, in the case where the cancel restriction command is received and a positive result is obtained in step S503 indicating that a cancel command has been received, the process proceeds to a step S504 and sets flagS=0. After that, the process reaches "RETURN" as illustrated.

Figure 17:
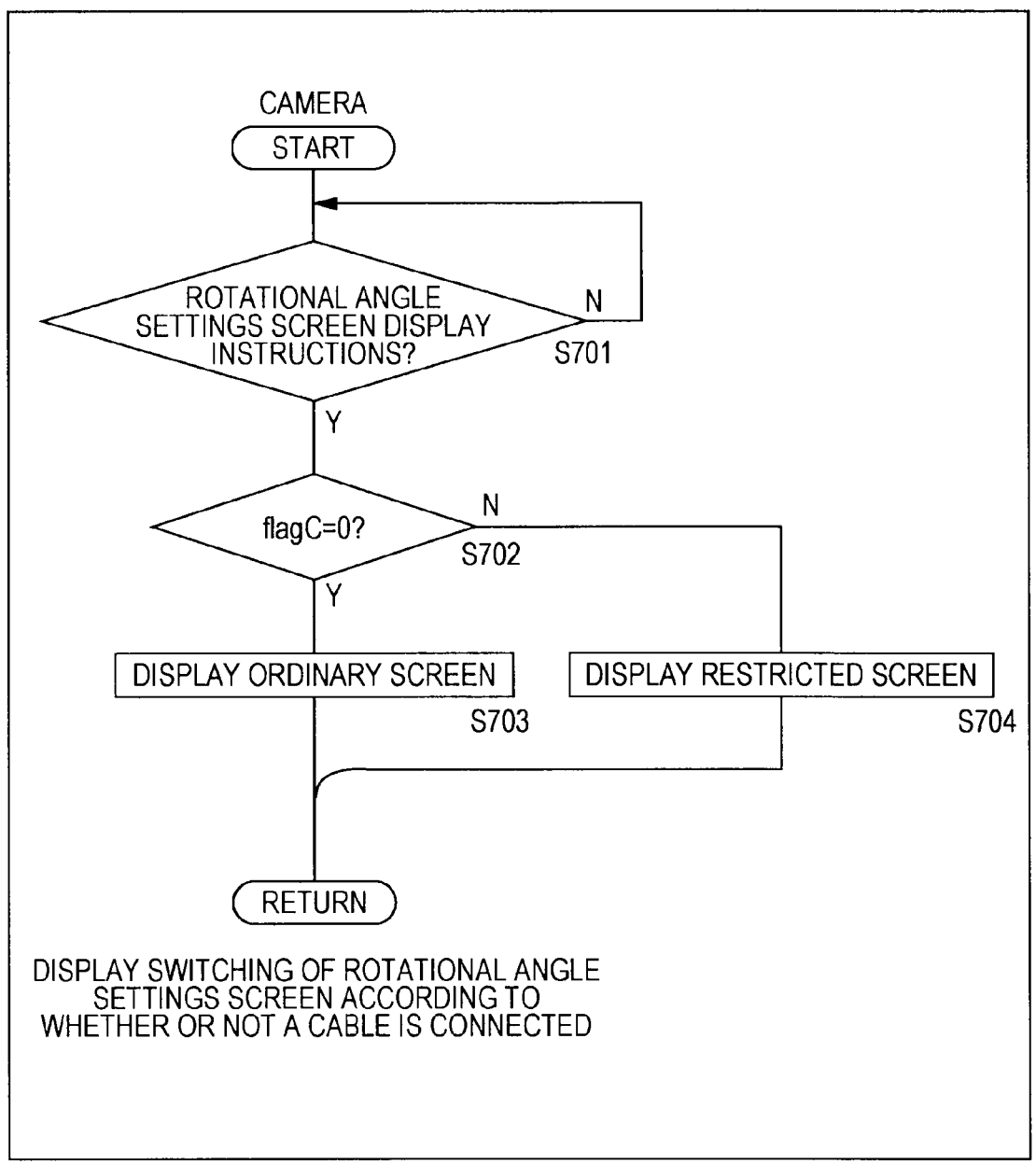
FIG. 17 is a flowchart illustrating a processing sequence to be executed in order to realize display switching of a rotational angle settings screen according to whether or not cables are connected.

Also, FIG. 17 illustrates a processing sequence to be executed in order realize display switching of a rotational angle settings screen according to whether or not cables are connected.

In FIG. 17, the process is configured to first stand by in a step S701 until instructions to display the rotational angle settings screen are issued. Specifically, the process stands by until a touch operation is performed on the icon representing the item for setting rotational angle range from among the icons for each setting displayed on the menu screen described earlier.

In the case where a touch operation is performed on the icon representing the item for setting the rotational angle range from the menu screen and a positive result is obtained in step S701 indicating that instructions to display the rotational angle settings screen exist, it is determined in a step S702 whether or not flagC=0 is true (or in other words, whether or not "Unrestricted" is set).

In the case where a positive result is obtained in step S702 in which flagC=0 is true, the process proceeds to a step S703 and ordinary screen display processing is conducted, which involves supplying screen data and instructions for its display to the display driver 32 such that a rotational angle settings screen is displayed in which all icons "Unrestricted", "180°", and "90°" are selectable as illustrated in the earlier FIG. 10.

In contrast, in the case where a negative result is obtained in step S702 in which flagC=0 is not true, the process proceeds to a step S704 and restricted screen display processing is conducted, which involves supplying screen data and instructions for its display to the display driver 32 such that a rotational angle settings screen is displayed in which the "Unrestricted" icon is non-selectable due to the "Unrestricted" icon being hidden or grayed out as illustrated in the earlier FIG. 12.

After executing the processing in step S703 or S704, the process reaches "RETURN" as illustrated.

<3. Modifications>

The foregoing has described an embodiment of the present invention, but the present invention is not limited to the specific examples described heretofore.

For example, in the foregoing description, a case was given by way of example wherein a rotational angle range in the pan direction for use during a subject search executed as part of automatic imaging operations is restricted in accordance with the case where cables are connected, with it being presupposed that an imaging system executes the automatic imaging operations according to automatic composing. However, rotational angle range restriction is not limited to such restriction during a subject search, and the present invention may also be broadly and favorably applied to imaging system (imaging apparatus) that vary an imaging field selection angle by rotation in the pan direction.

Also, although the rotational angle range in the pan direction is configured to be selectable from among three types of predetermined ranges in the foregoing description, it may also be configured such that one may be selected from among two types, or four or more types.

Alternatively, it may also be configured such that a user cannot set a rotational angle range.

Alternatively, it may also be configured such that a user sets a rotational angle range with arbitrary numerical value input. In this case, it may be configured such that when cables are connected, it is determined whether or not the angle range set by the numerical value input is within an allowable angle range (within a range of ±90°, for example), wherein that setting is maintained if within the allowable angle range and restricted to within the allowable angle range if outside the allowable angle range.

Also, in the foregoing description, a given rotational angle range is uniformly set in the case where cables are removed, regardless of the state of the rotational angle range setting before the angle restriction (in the embodiment, the rotational angle range is set to "Unrestricted"). Obviously, however, it may also be configured such that the state of the rotational angle range setting is reverted back the original state of the setting before the angle restriction in the case where cables are removed, in order to respect user settings.

In this case, information on the original rotational angle range before the angle restriction is stored, and the original rotational angle range is set on the basis of the stored information when cables are removed.

Also, in the foregoing description, it is configured such that the controller 51 at the platform issues a connection notification to the controller 27 indicating that cables have been connected on the basis of detection signals from the connection detector 59, while the controller 27 issues restriction instructions to the controller 51 in response to the connection notification, thereby causing the controller 51 to execute processing to restrict the rotational angle range. However, it may also be configured such that a connection notification from the platform to the camera like that above is made unnecessary, and operations for restricting the rotational angle range are completed at the platform only.

However, if it is configured such that a connection notification is issued from the platform to the camera as given by way of example in the embodiment, the current angle restriction state can be ascertained at the camera. As a result, this has merits such as enabling display switching of a rotational angle settings screen like that illustrated in FIG. 12.

Alternatively, it may also be configured such that, in the case where the controller 51 at the platform is reduced or omitted and the controller 27 assumes the driving control of the pan driving units (pan driving unit 55, pan motor 54, pan mechanism unit 53), detection signals from the connection detector 59 are directly input into the controller 27 and the controller 27 executes processing to control the pan driving units and restrict the rotational angle range on the basis of the detection signals.

In so doing, diverse variations of configurations for restricting a rotational angle range on the basis of a cable connection are conceivable, and such specific configurations are not limited to that given by way of example in the embodiment.

Also, in the foregoing description, a case was given by way of example wherein cable ports (the terminal units t in the embodiment) are provided on the platform, but the present invention may also be favorably applied to the case where the cable ports are provided on the camera. In other words, in this case, it may be configured such that it is determined whether or not cables are connected to cable ports provided on the camera, and control is conducted so as to restrict the rotational angle range in the pan direction on the basis of the determination results.

At this point, to summarize the above, in the case where the present invention is applied to an imaging system comprising an imaging apparatus at least provided with an imaging unit and a platform apparatus which removably holds the imaging apparatus and which at least includes a rotational driving controller, cable ports may be provided on a driven unit, including the imaging apparatus, that becomes a movable part as pan operations are conducted by the pan driving unit. In other words, cable ports may be provided on a portion other than the portion that acts as the stationary part, the pedestal 15.

Also, a controller that determines whether or not cables have been connected to cable ports and controls the rotational angle range for the rotational driving unit on the basis of the determination results may be provided in either the imaging apparatus or the platform apparatus. Alternatively, a controller may also be provided so as to extend into the imaging apparatus and the platform apparatus as illustrated by way of example in the embodiment.

Also, in the foregoing description, a case was given by way of example wherein an imaging unit driving apparatus and imaging apparatus of the present invention are configured such that the imaging apparatus and the platform apparatus can be decoupled (or in other words, the case where they may become separate apparatus). Obviously, however, it may also be configured such that the imaging apparatus and the platform apparatus cannot be decoupled from each other and are formed in an integrated manner.

Also, at least part of a configuration based on the present invention may be realized by causing a CPU or DSP to execute a program.

Besides being written to ROM, etc. at the time of manufacture and stored therein, for example, such a program may conceivably be stored on a removable storage medium, and then installed (this also includes updating) from the storage medium to be stored in a DSP-compatible non-volatile storage area, the flash memory 30, etc. It is also conceivable to enable program installation by control from a device that acts as another host via a data interface such as USB (Universal Serial Bus) or IEEE 1394. Furthermore, it may also be configured such that a program is stored in advance on a storage apparatus in a server, etc. on a network and the digital still camera 1 is equipped with network functions so as to be able to download and acquire the program from the server.

Reference Signs List 1 digital still camera
2 main unit
21a lens unit
31a release button
10 platform
11 main unit
12 camera seat
13 projection
14 connector
21 optics
22 image sensor
23 A/D converter
24 signal processor
25 encoder/decoder
26 media controller
27 controller
28 ROM
29 RAM
30 flash memory
31 operable unit
32 display driver
33 display unit
34 platform-compatible communication unit
40 memory card
51 controller
52 communication unit
53 pan mechanism unit
54 pan motor
55 pan driving unit
56 tilt mechanism unit
57 tilt motor
58 tilt driving unit
59 connection detector
60 operable unit
60a menu button
61 power circuit
t-Vin power terminal unit
t-Video video terminal unit

The invention claimed is:

1. A control apparatus, comprising:
a driving controller that controls a driving unit which varies the rotational angle of a movable unit with respect to a stationary unit on the basis of a rotational angle range setting; and
a rotational angle range setter that varies the rotational angle range setting according to whether or not a cable is connected to a cable port which removably connects the cable and which is formed at a position that rotates as rotation operations are conducted by the driving unit, the rotational angle range setter varying the rotational angle range setting such that the rotational angle of the driving unit is unrestricted in the case where the cable is removed from the cable port.

2. The control apparatus according to claim 1, wherein the cable port is formed on the movable unit.

3. The control apparatus according to claim 1, wherein the rotational angle range setter variably sets the rotational angle range setting on the basis of operational input, and additionally, in the case where the cable is connected to the cable port, is configured such that the rotational angle range setting is maintained at a rotational angle range setting set on the basis of the operational input when the rotational angle range setting set on the basis of the operational input is within a predetermined allowable angle range, and is configured such that the rotational angle range setting is restricted to within the allowable angle range when a rotational angle range setting set on the basis of the operational input is not within the predetermined allowable angle range.

4. The control apparatus according to claim 3, further comprising:
a display unit that displays images; wherein the rotational angle range setter causes the display unit to display a rotational angle range settings screen for the user to specify the rotational angle range setting, and variably sets the rotational angle range setting on the basis of operational input conducted while the rotational angle settings screen is being displayed, and additionally, in the case where the cable is connected to the cable port, causes the display unit to display a screen as the rotational angle range settings screen such that rotational angle range settings outside the allowable angle range cannot be specified.

5. The control apparatus according to claim 4, wherein the rotational angle range setter causes a screen to be displayed as the rotational angle range settings screen such that a required rotational angle range setting is specified from among a plurality of rotational angle range settings, and additionally, in the case where the cable is connected to the cable port, causes the display unit to display a screen as the rotational angle range settings screen such that information on rotational angle range settings outside the allowable angle range are grayed out or hidden.

6. The control apparatus according to claim 3, wherein the rotational angle range setter changes the rotational angle range setting to that specified by the operational input in the case where the cable is removed from the cable port.

7. A control method for a control apparatus having a driving controller that controls a driving unit which varies the rotational angle of a movable unit with respect to a stationary unit, on the basis of a rotational angle range setting, and a rotational angle range setter that varies the rotational angle range setting according to whether or not a cable is connected to a cable port which removably connects the cable and which is formed at a position that rotates as rotation operations are conducted by the driving unit, the control method including:
controlling the driving unit which varies the rotational angle of the movable unit with respect to the stationary unit on the basis of the rotational angle range setting; and
setting the rotational angle range setting according to whether or not the cable is connected to the cable port, the setting including varying the rotational angle range setting such that the rotational angle of the driving unit is unrestricted in the case where the cable is removed from the cable port.

8. An imaging apparatus, comprising:
an imaging unit that conducts imaging;
a cable port which removably connects a cable and which is formed at a position that rotates as rotation operations are conducted by a driving unit which varies the rotational angle of the imaging unit with respect to a stationary unit;
a driving controller that controls the driving unit on the basis of a rotational angle range setting; and
a rotational angle range setter that varies the rotational angle range setting according to whether or not the cable is connected, the rotational angle range setter varying the rotational angle range setting such that the rotational angle of the driving unit is unrestricted in the case where the cable is removed from the cable port.

9. A non-transitory computer readable medium encoded with a program causing processing to be executed by an imaging apparatus provided with an imaging unit that conducts imaging and a cable port which removably connects a cable and which is formed at a position that rotates as rotation operations are conducted by a driving unit which varies the rotational angle of the imaging unit with respect to a stationary unit, the program causing the imaging apparatus to execute a method comprising:
controlling the driving unit on the basis of a rotational angle range setting; and
setting the rotational angle range setting according to whether or not the cable is connected, the setting including varying the rotational angle range setting such that the rotational angle of the driving unit is unrestricted in the case where the cable is removed from the cable port.

10. An imaging system provided with an imaging apparatus having an imaging unit that conducts imaging, and a platform apparatus which removably holds the imaging apparatus and which is provided with a driving controller that controls a driving unit which varies the rotational angle of the imaging apparatus with respect to a stationary unit on the basis of a rotational angle range setting, the imaging system comprising:
a cable port which removably connects a cable and which is formed at a position that rotates as rotation operations are conducted by the driving unit; and
a rotational angle range setter that varies the rotational angle range setting according to whether or not the cable is connected, the rotational angle range setter varying the rotational angle range setting such that the rotational angle of the driving unit is unrestricted in the case where the cable is removed from the cable port.

* * * * *